United States Patent [19]
Yamaguchi et al.

[11] Patent Number: 5,737,022
[45] Date of Patent: Apr. 7, 1998

[54] MOTION PICTURE ERROR CONCEALMENT USING SIMPLIFIED MOTION COMPENSATION

[75] Inventors: Noboru Yamaguchi, Yashio; Hideyuki Ueno, Tokyo, both of Japan

[73] Assignee: Kabushiki Kaisha Toshiba, Kawasaki, Japan

[21] Appl. No.: 488,051

[22] Filed: Jun. 7, 1995

Related U.S. Application Data

[63] Continuation-in-part of Ser. No. 202,269, Feb. 25, 1994, abandoned.

[30] Foreign Application Priority Data

Feb. 26, 1993 [JP] Japan .................................. 5-037233
Dec. 14, 1993 [JP] Japan .................................. 5-313405

[51] Int. Cl.$^6$ ........................................... H04N 7/32
[52] U.S. Cl. .................................. 348/416; 348/845.1
[58] Field of Search ........................... 348/416, 415, 348/409, 402, 401, 400, 420, 390, 384, 845.1; 382/238, 236, 233, 232; H04N 7/137

[56] References Cited

U.S. PATENT DOCUMENTS

| | | | |
|---|---|---|---|
| 5,243,428 | 9/1993 | Challapali et al. | 348/607 |
| 5,400,076 | 3/1995 | Iwamura | 348/416 |
| 5,420,872 | 5/1995 | Hyode et al. | 348/616 |
| 5,442,400 | 8/1995 | Sun et al. | 348/402 |

OTHER PUBLICATIONS

Wada, "Selective Recovery of Video Packet Loss Using Error Concealment", IEEE Journal on Selected Areas in Communications, vol. 7, No. 5, Jun. 1989, pp. 807–814.
Proceedings of Darnlu . . . , Autumn 1992, p. 164, Senda et al., "A Study on Low Delay Interframe Prediction Coding" (month not available).
Wikkei Electronics, May 10, 1993, pp. 63–64.
Proc. Picture Coding Symposium of Japan, 6–1, Oct. 1992, pp. 205–208, Yucaka Machida, et al., "Video Coding Method with Cell Loss Resilience on ATM Networks".
Proc. Picture Coding Symposium of Japan, 9–2, Oct. 1991, pp. 243–246, Takashi Hamano, et al., "A Consideration of Video Codec for ATM Networks".
Proc. IEEE ICASSP, vol. 5, Apr. 1993, pp. 417–420, Wai–Man Lam, et al., "Recovery of Lost or Erroneously Received Motion Vectors".
IEEE Transactions on Consumer Electronics, vol. 38, No. 3, Aug. 1992, pp. 108–117, H. Sun, et al., "Error Concealment in Digital Simulcast AD–HDTV Decoder".
Journal of Institute of Television Engineers of Japan, vol. 48, No. 1, pp. 44–49, 1994, Watanabe, "MPEG. 2/H. 262".
Image Coding Symposium, pp. 243–246, 1991, (PCSJ91), 9–2, "Study of ATM Image Coding System", Takashi Hamano, et al.

*Primary Examiner*—Bryan S. Tung
*Attorney, Agent, or Firm*—Oblon, Spivak, McClelland, Maier & Neustadt, P.C.

[57] ABSTRACT

A motion picture image transmission apparatus constructing a motion picture image transmission system for coding and decoding a motion picture signal in the block unit includes an output section for detecting an error of received coded data and outputting a detection signal, an identifying section for identifying a non-decodable block based on the detection signal, a prediction section for subjecting values of pixels near the non-decodable block to motion compensation prediction according to the respective motion vectors and motion compensation methods of a plurality of decodable blocks near the block, a calculating section for calculating motion compensation prediction error values of the results of prediction, a selecting section for selecting a motion vector applied to the non-decodable block from the plurality of motion vectors or the like based on the error value, and a correcting section for correcting a decodable block by motion compensation by use of the selected motion vector or the like.

4 Claims, 20 Drawing Sheets

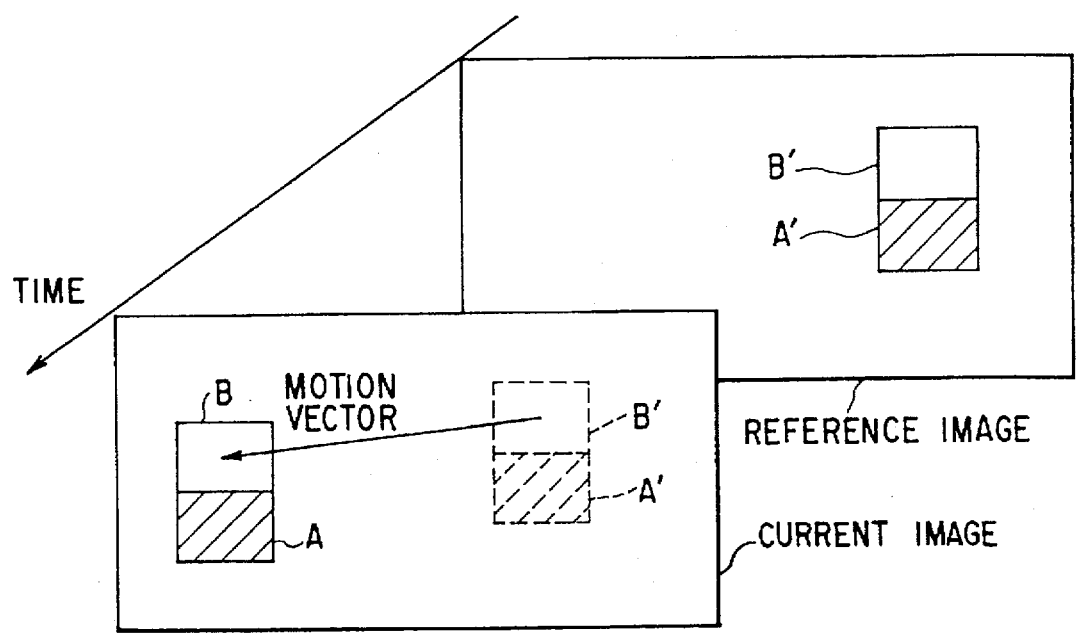
FIG. 1 PRIOR ART
PRIOR ART
FIG. 2A
PRIOR ART
FIG. 2B
PRIOR ART
FIG. 2C

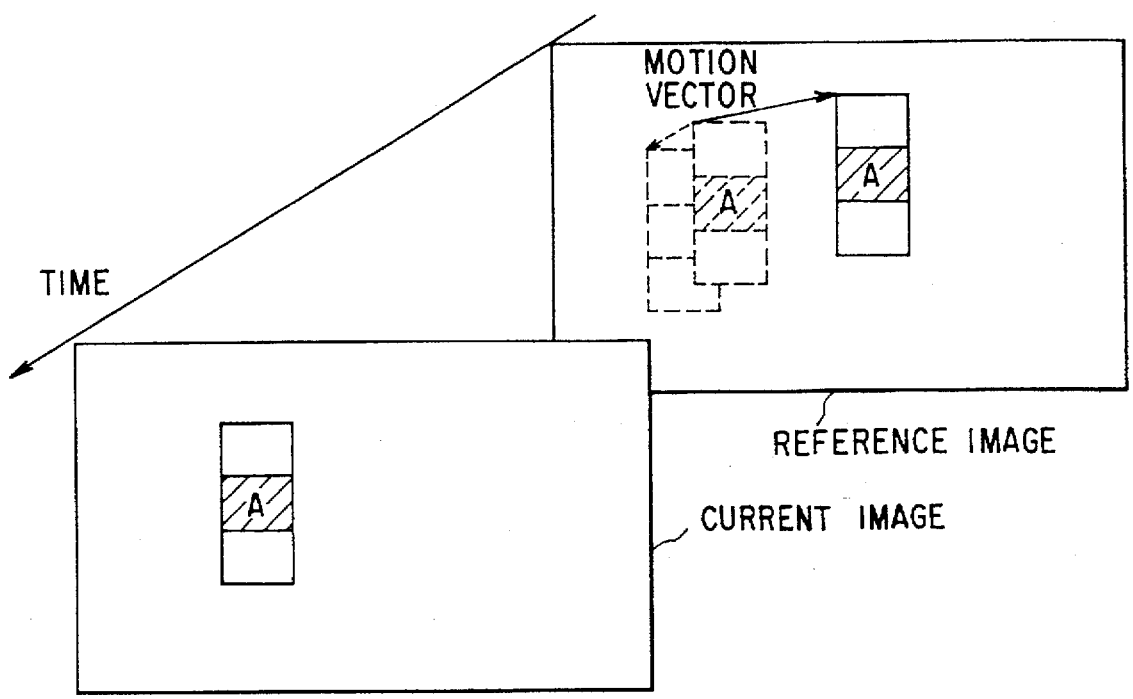
F I G. 3   PRIOR ART
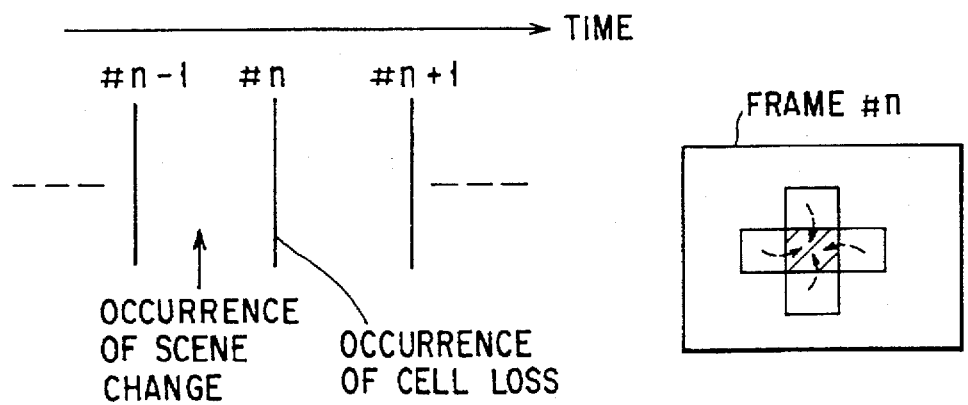
PRIOR ART
F I G. 4A
PRIOR ART
F I G. 4B

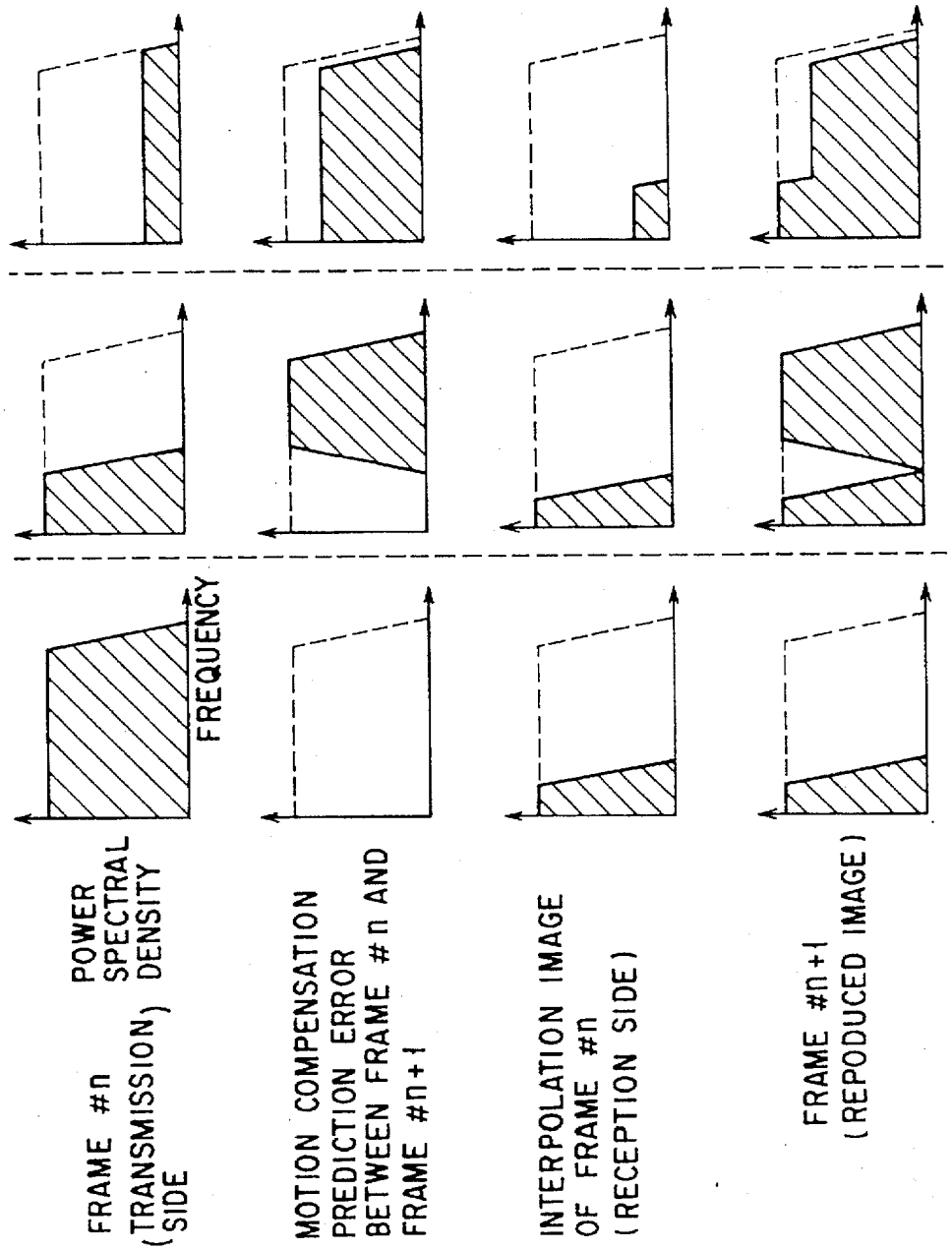

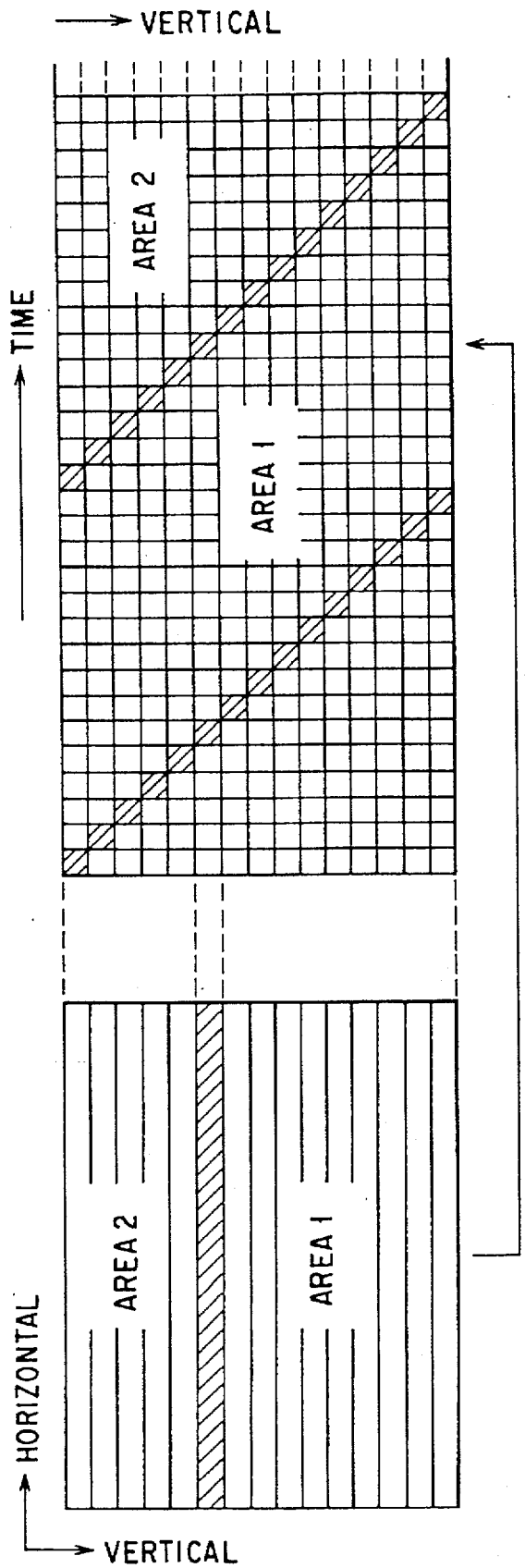
FIG. 6  PRIOR ART

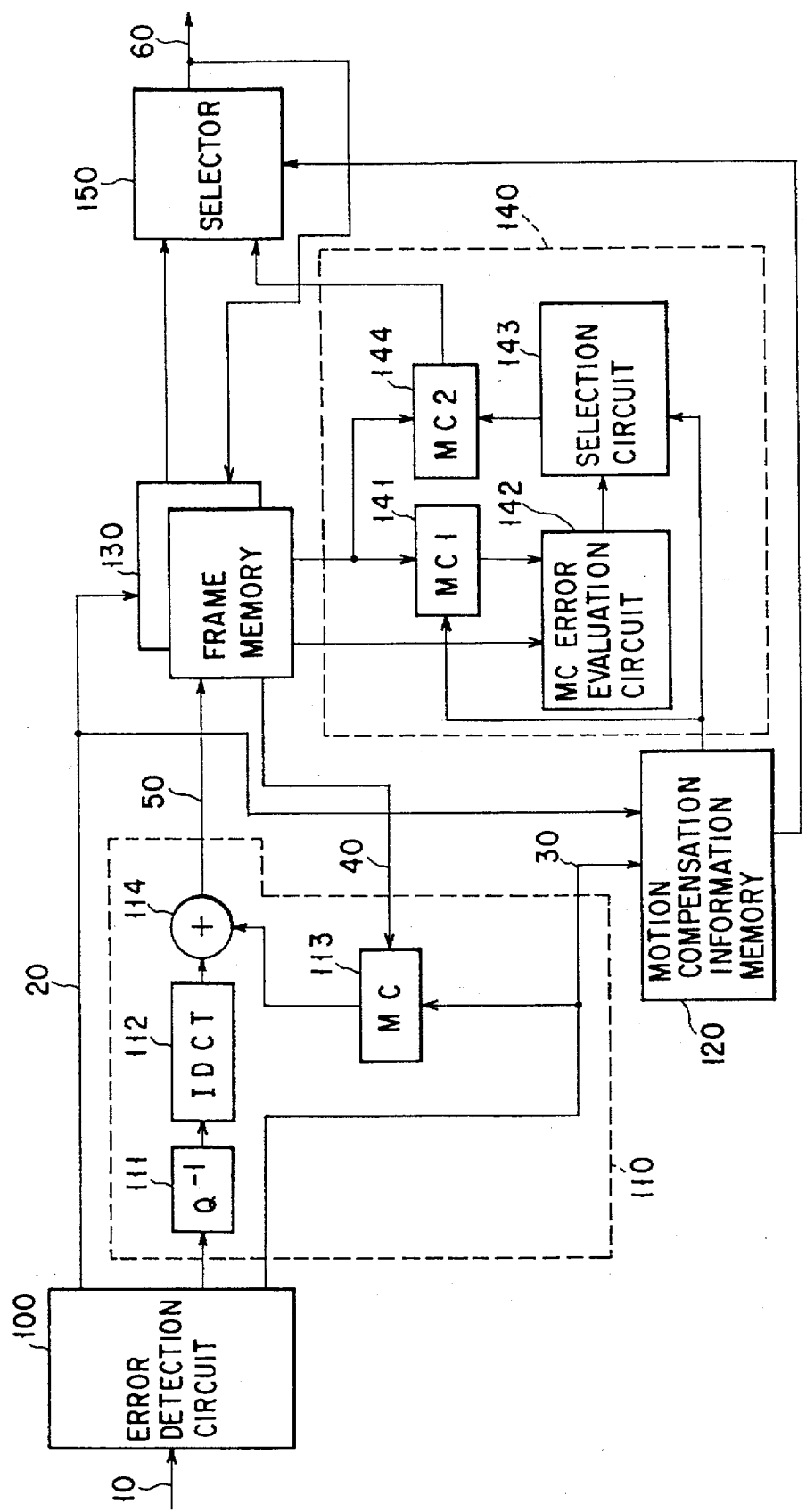
F I G. 7

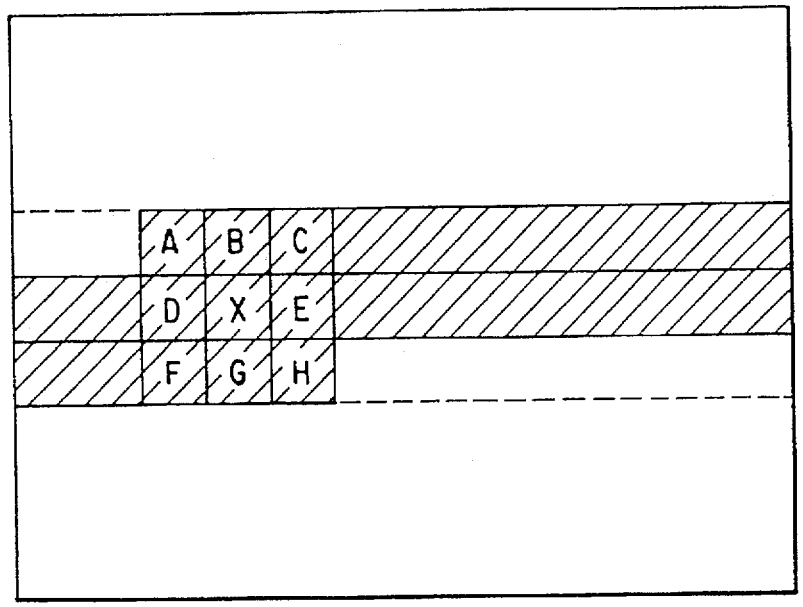
FIG. 8A
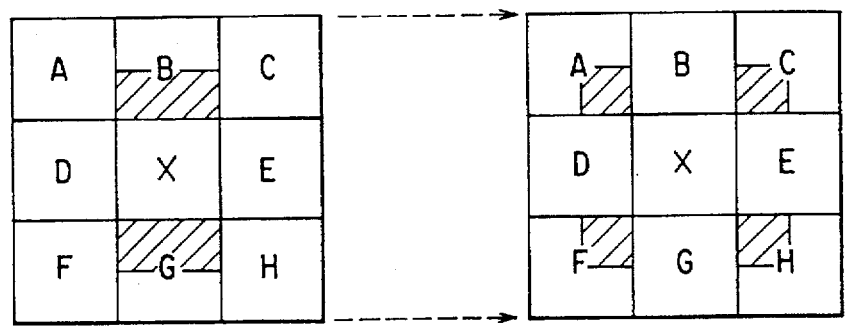
FIG. 8B
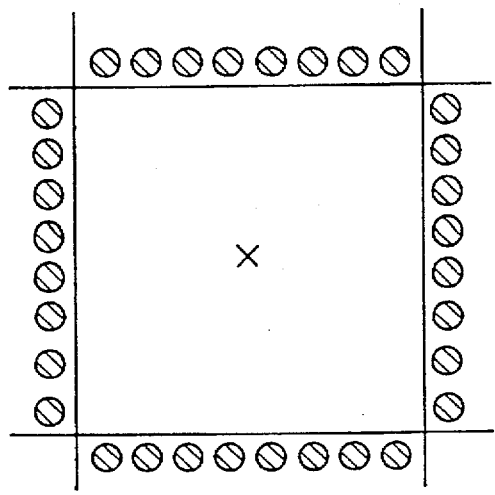
FIG. 8C

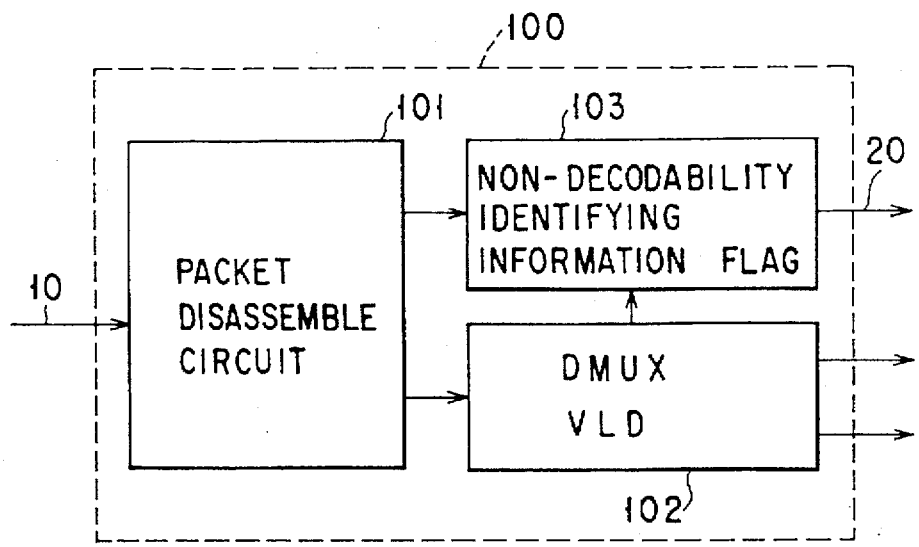
FIG. 9A
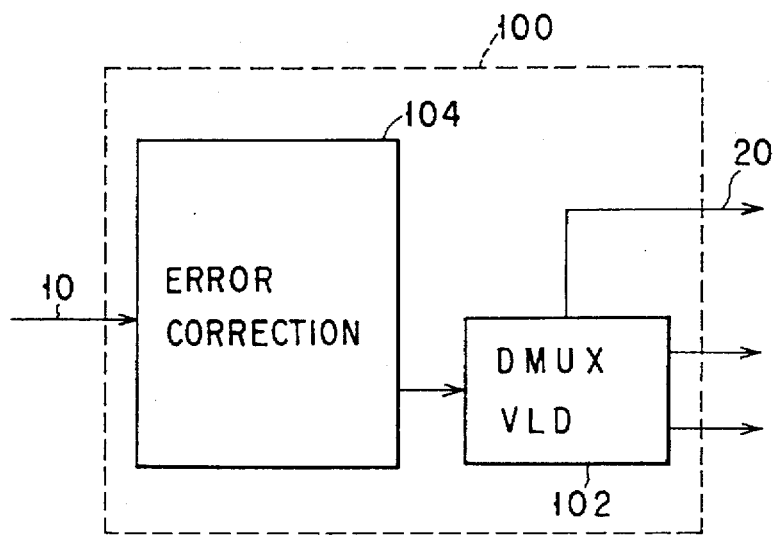
FIG. 9B

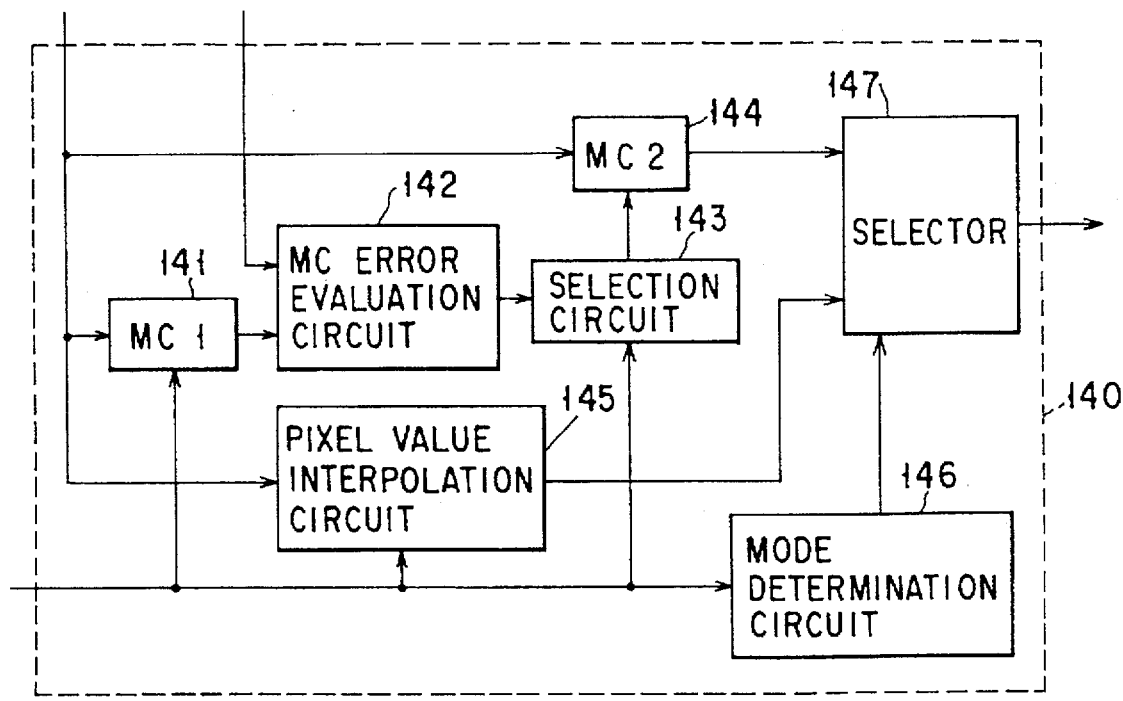
F I G. 10
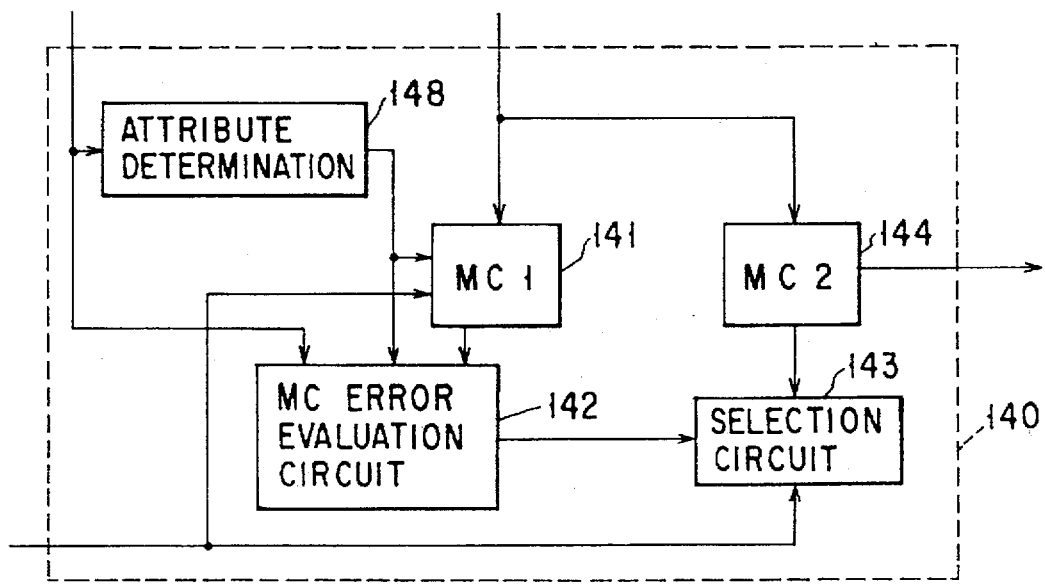
F I G. 11

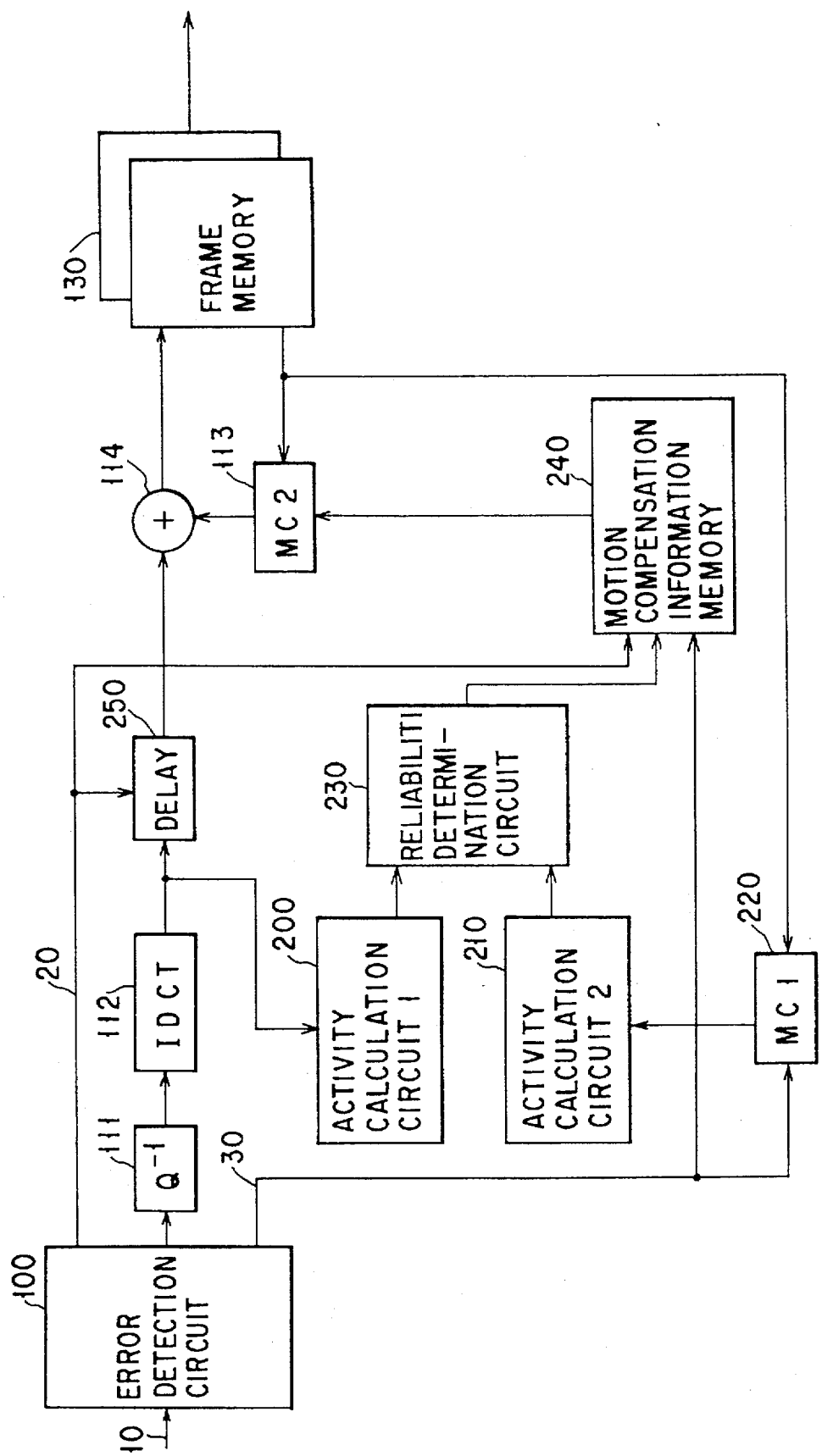
FIG. 12

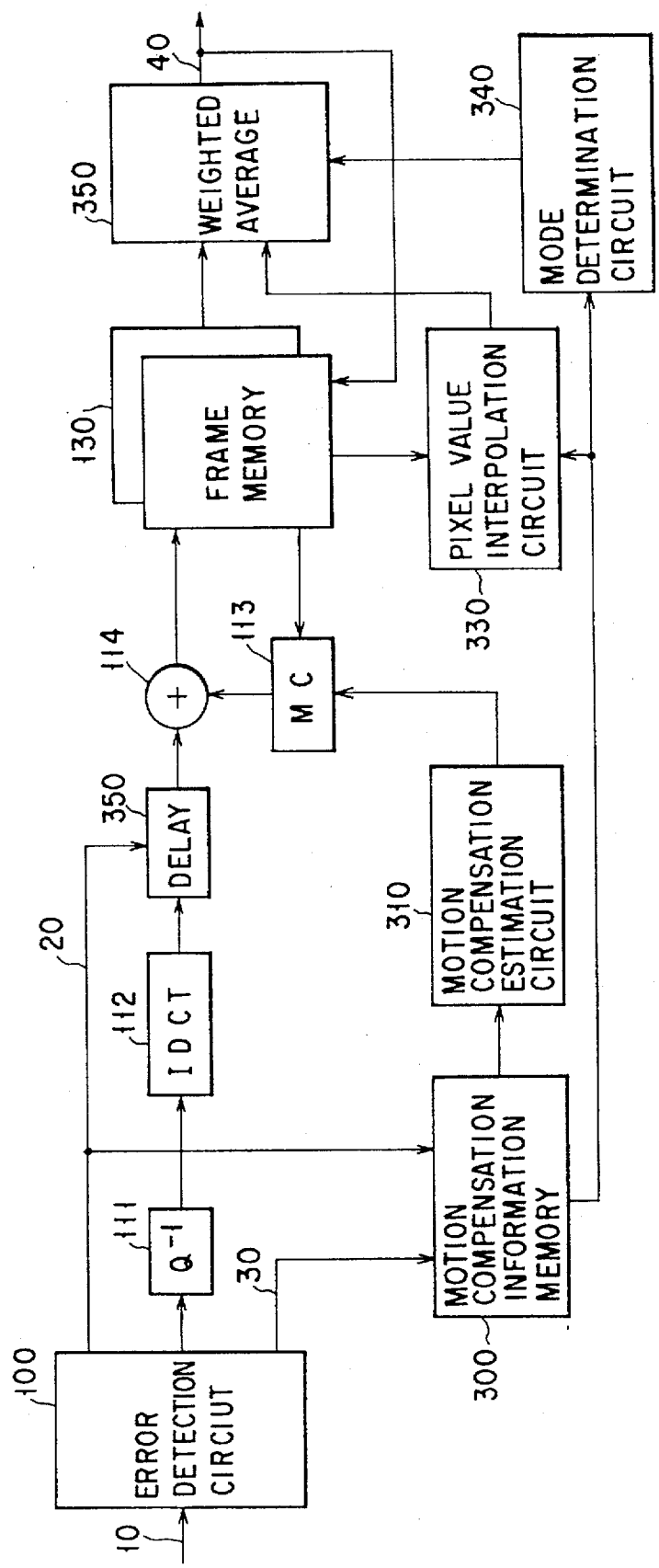
FIG. 13

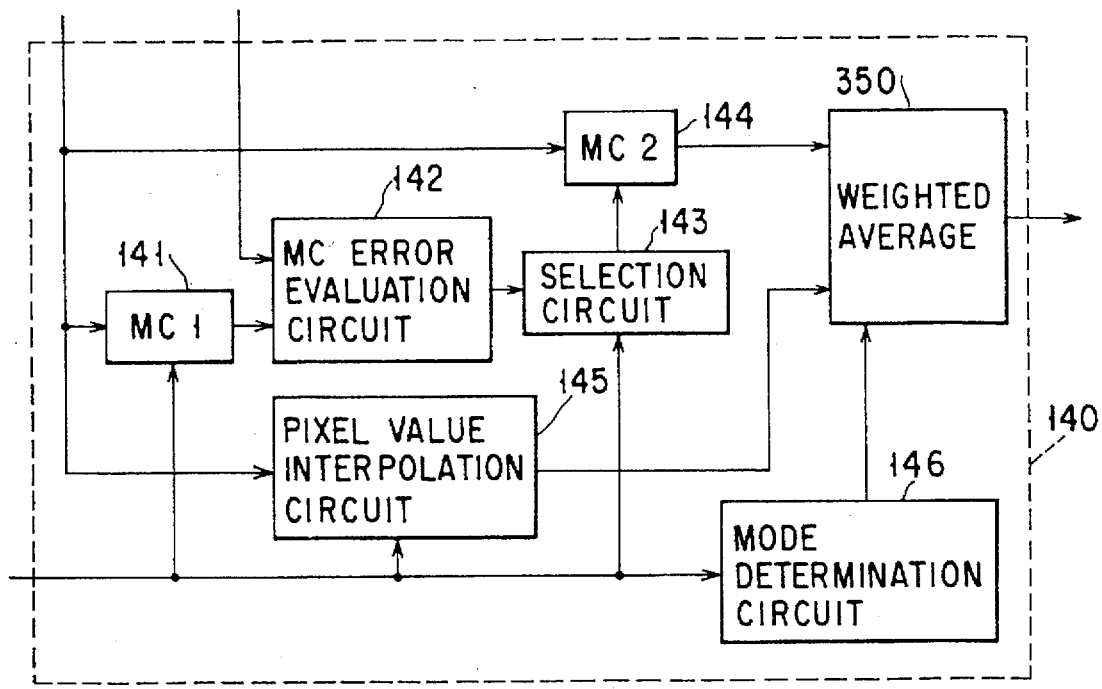
F I G. 14
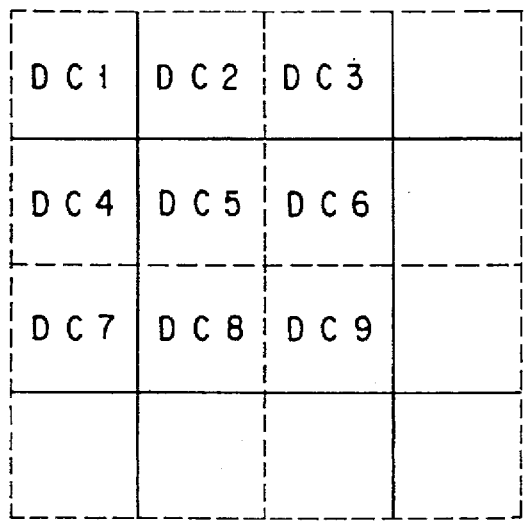
F I G. 16A
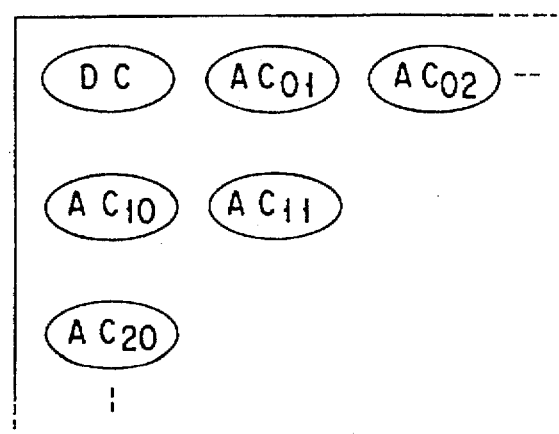
F I G. 16B

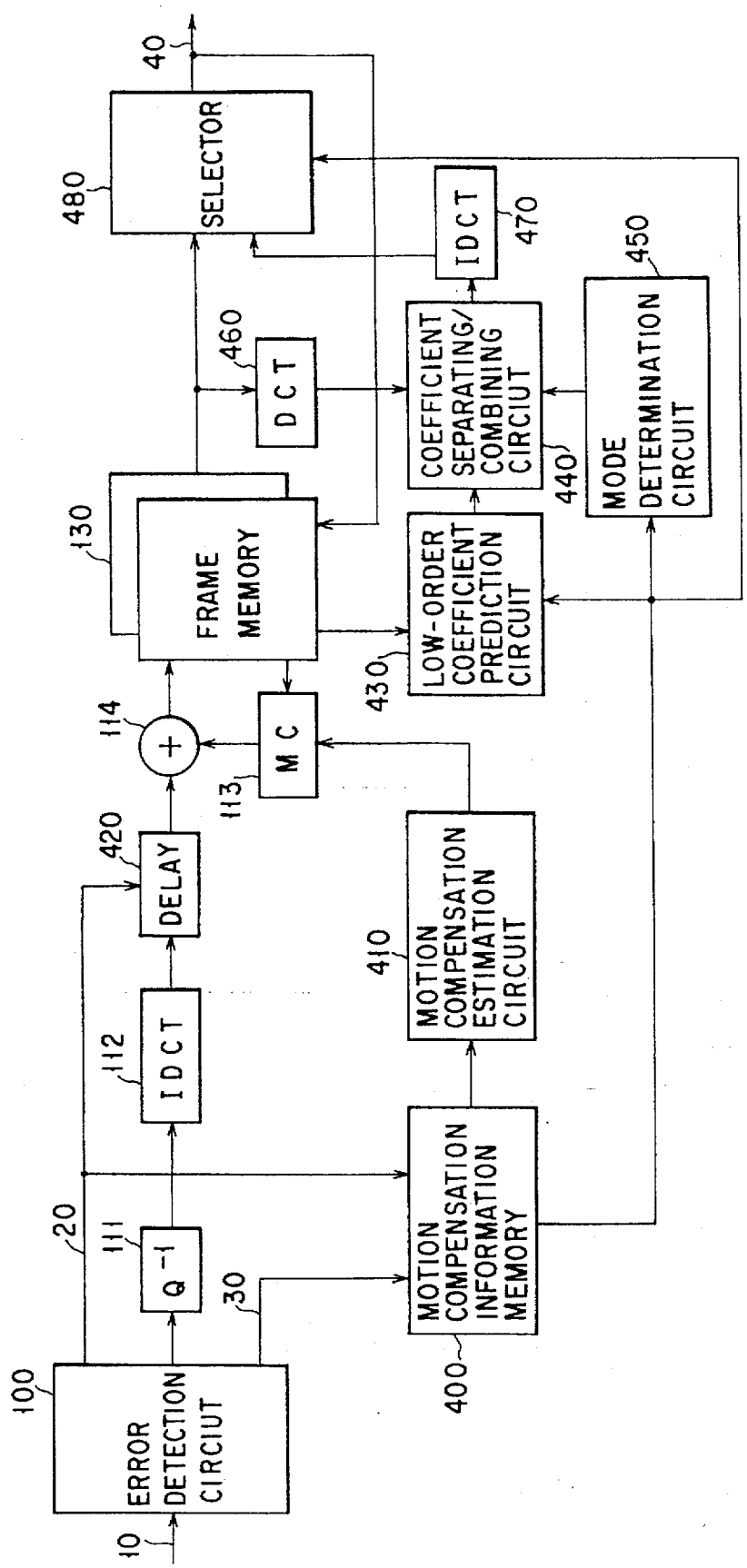
F I G. 15

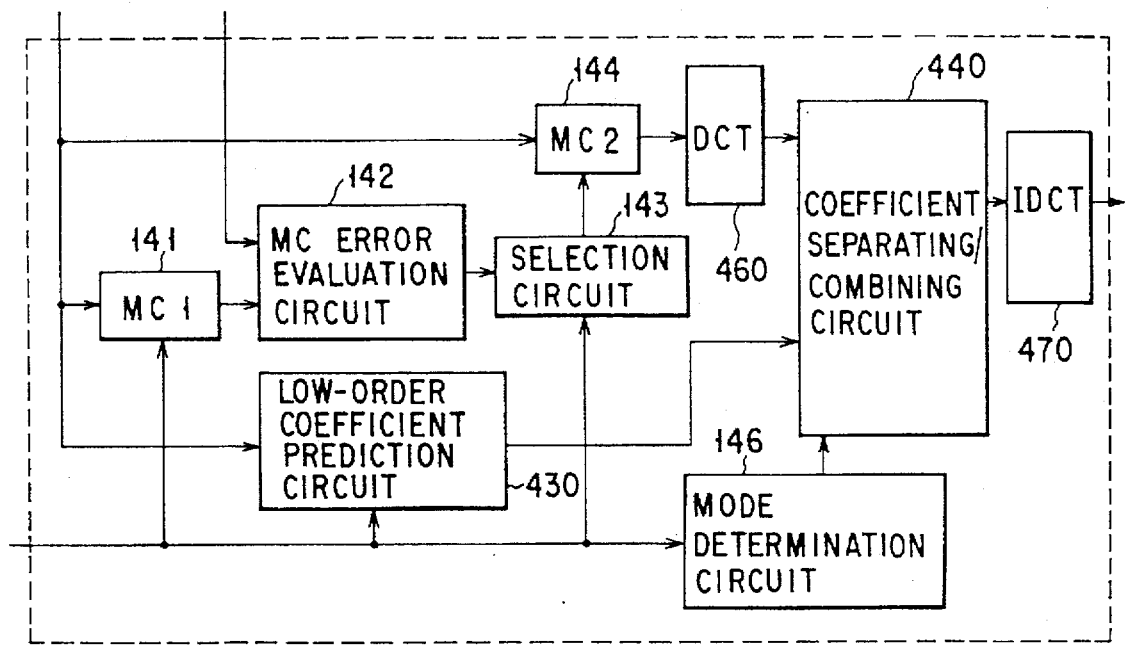
F I G. 17
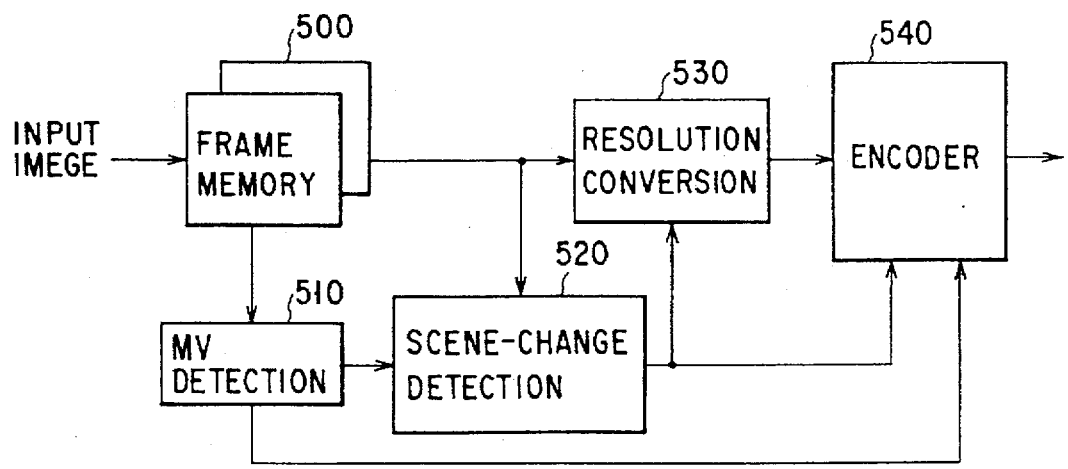
F I G. 18

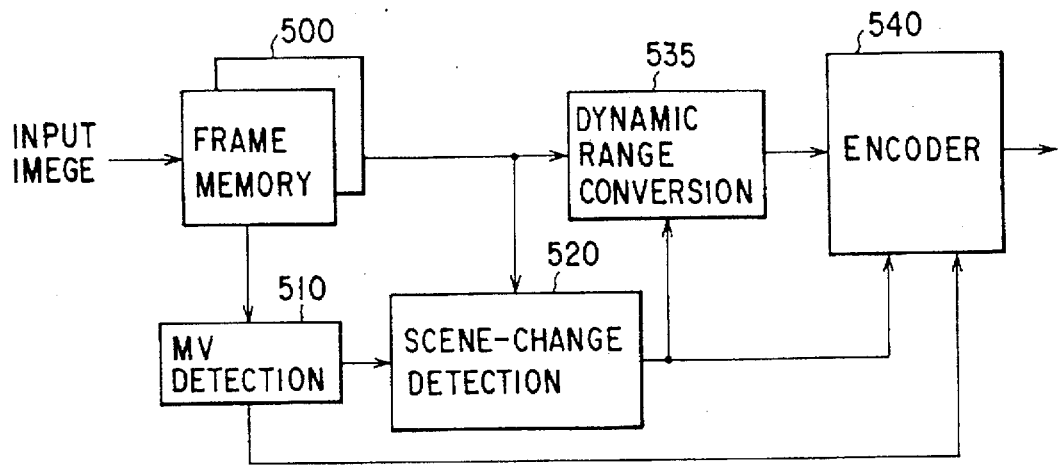
F I G. 19
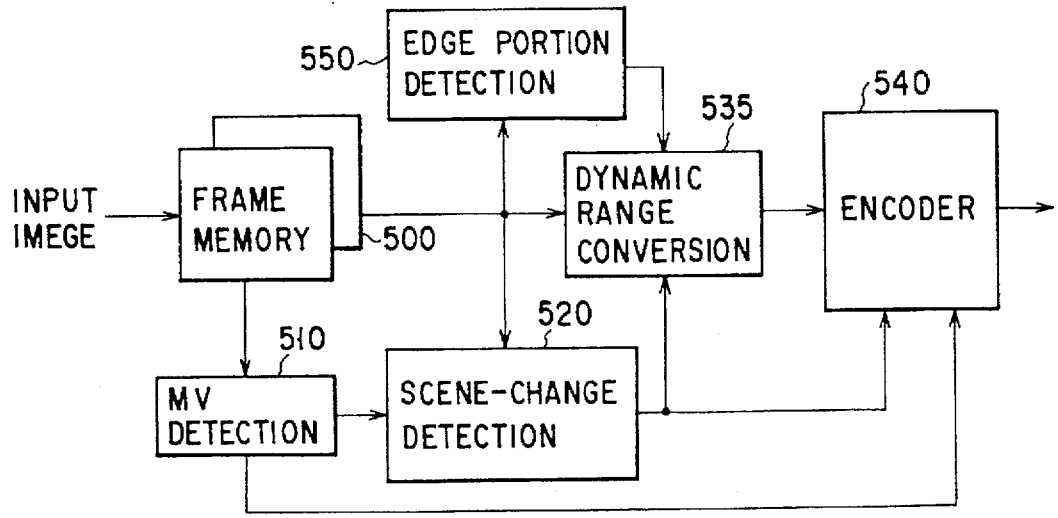
F I G. 20
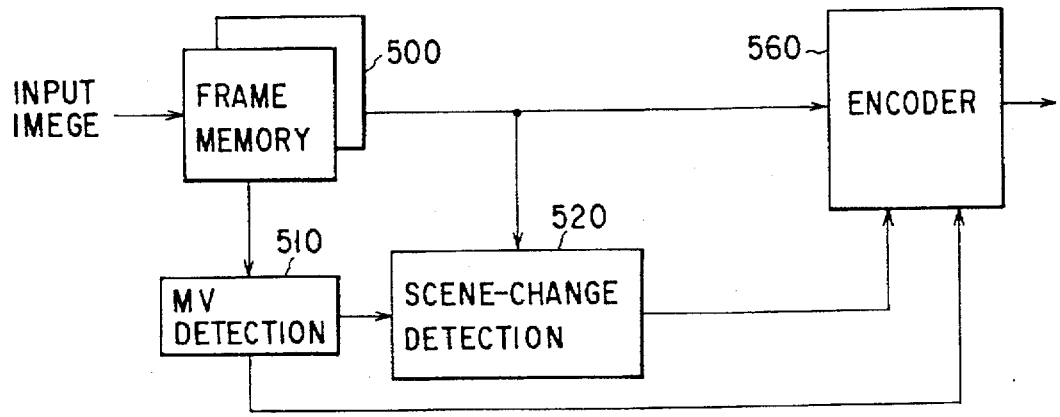
F I G. 21

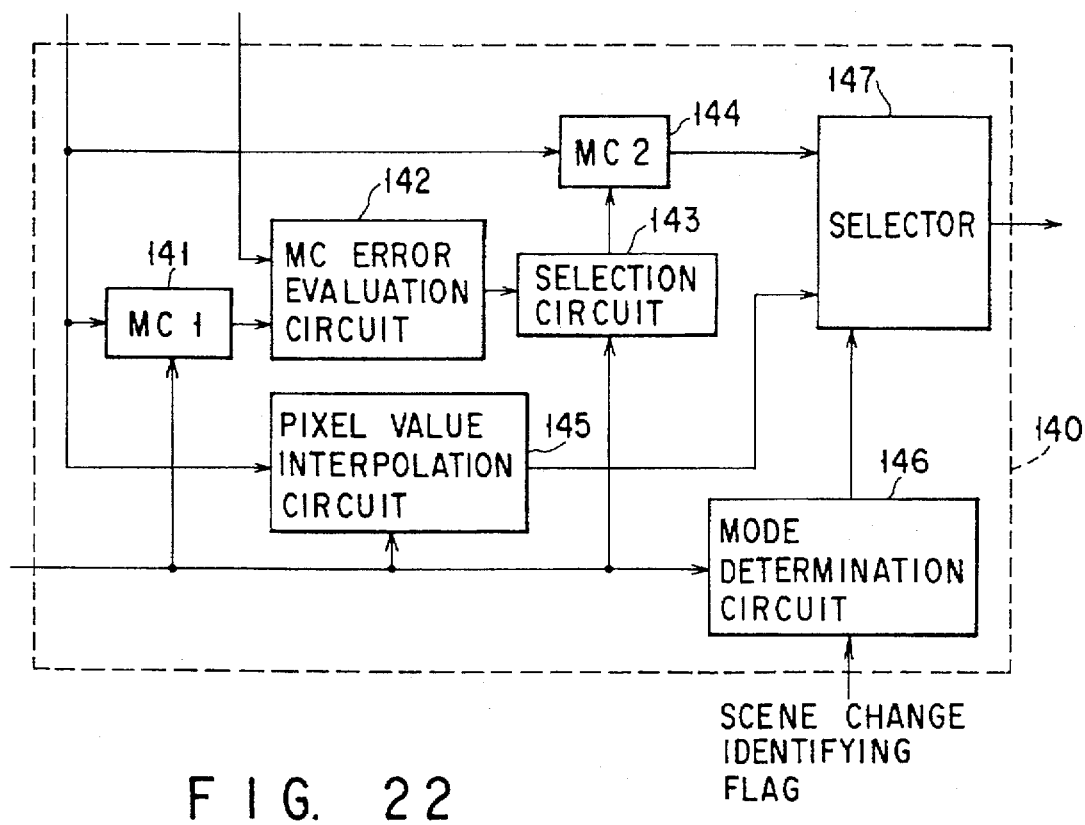
F I G. 22
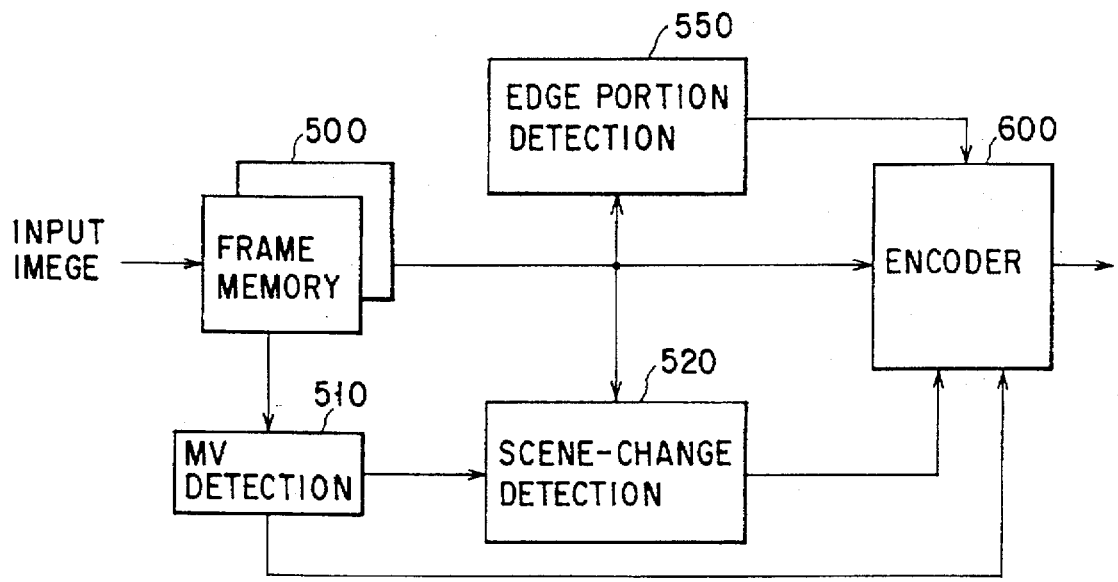
F I G. 23

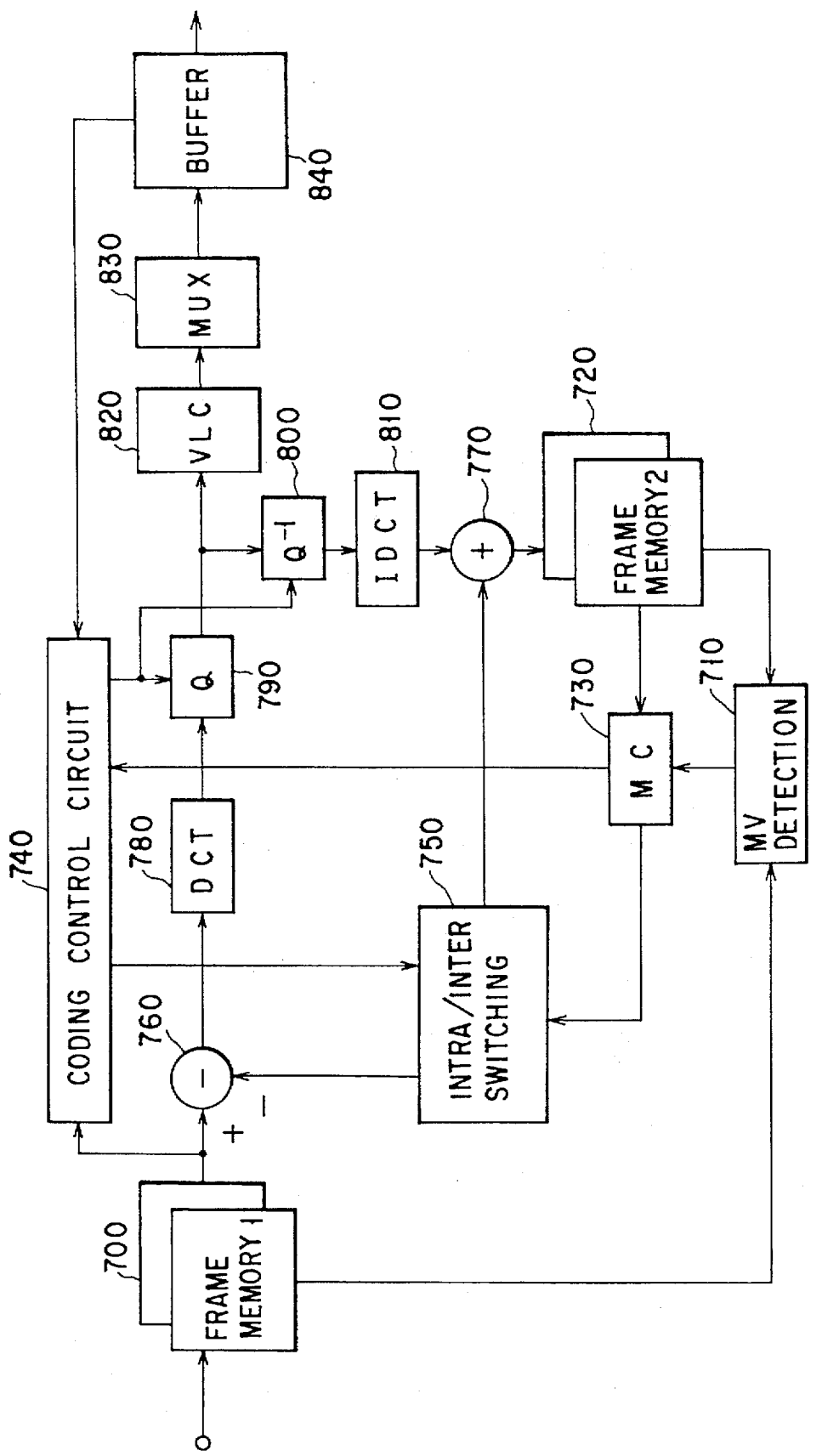
FIG. 24

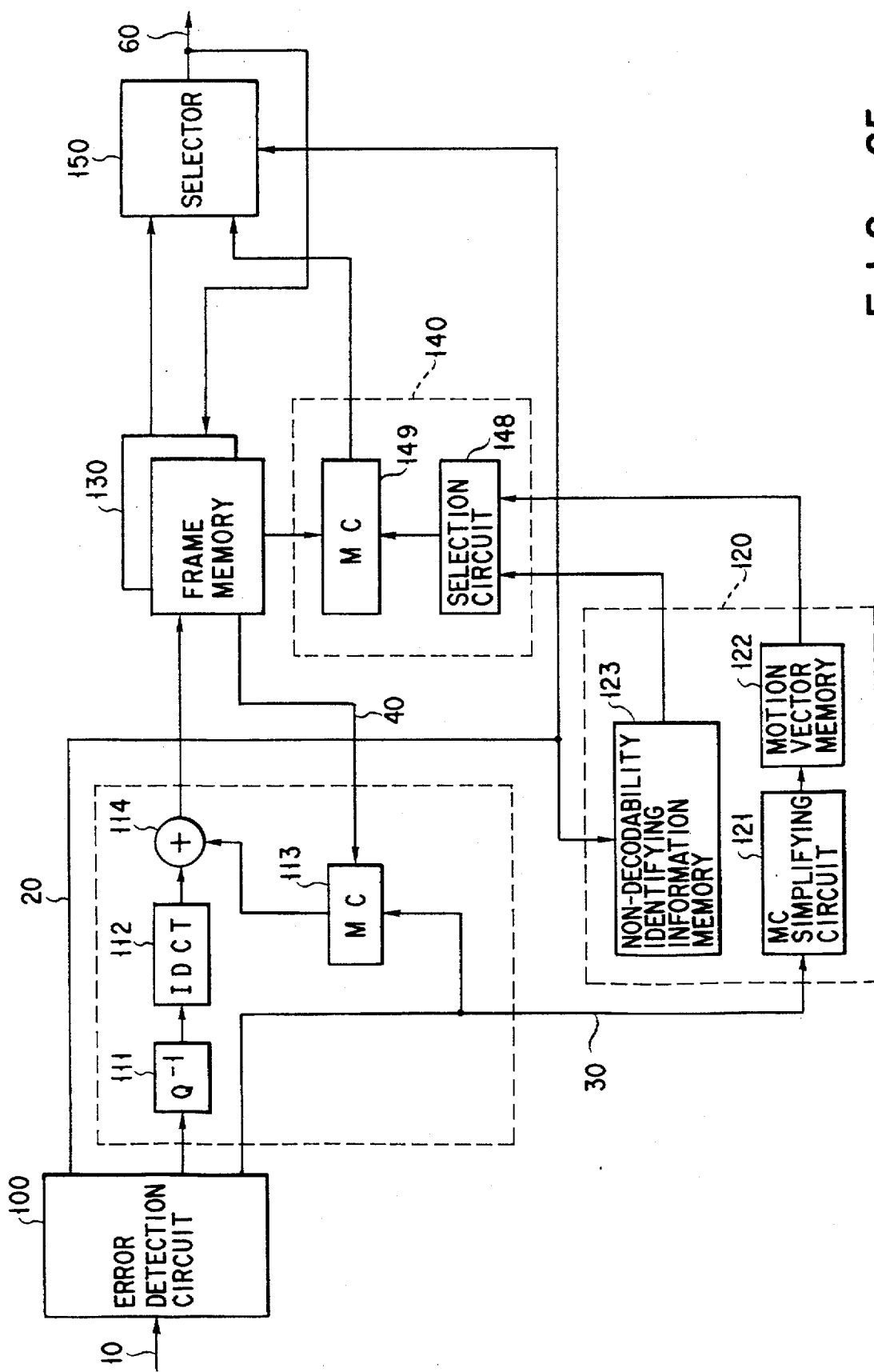
FIG. 25

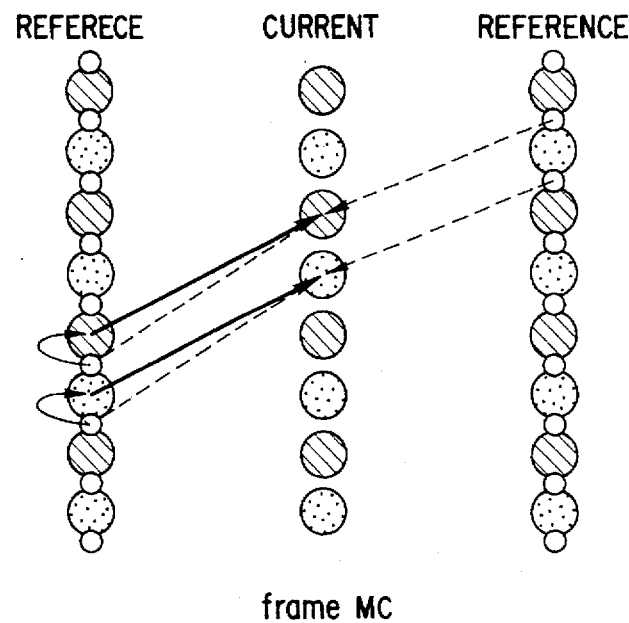
frame MC
FIG. 26A
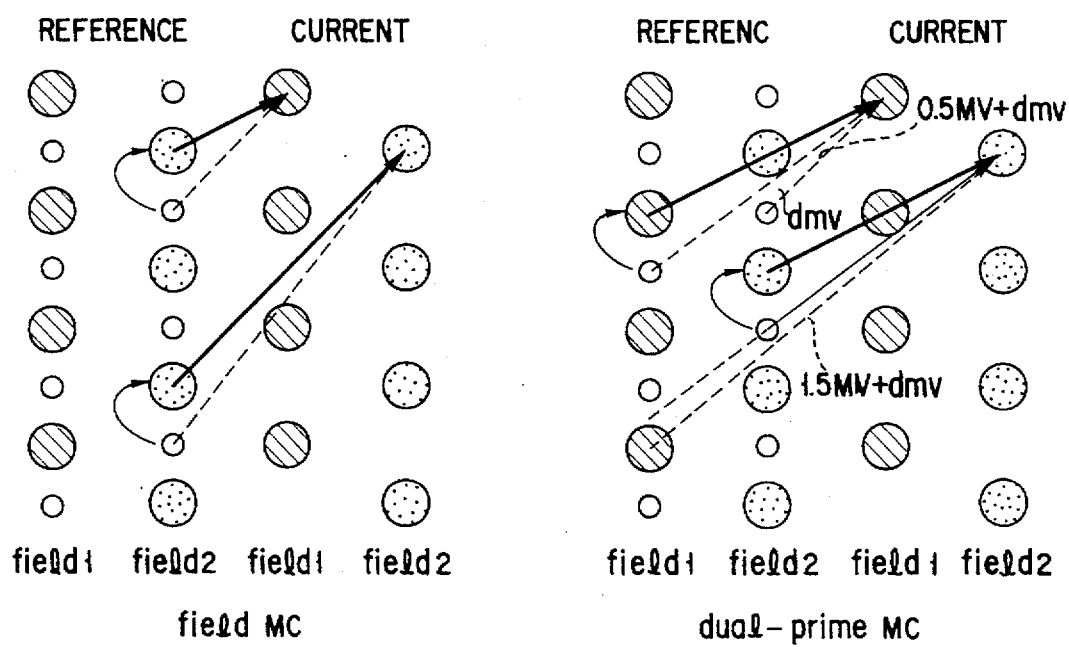
field MC
FIG. 26B
dual-prime MC
FIG. 26C

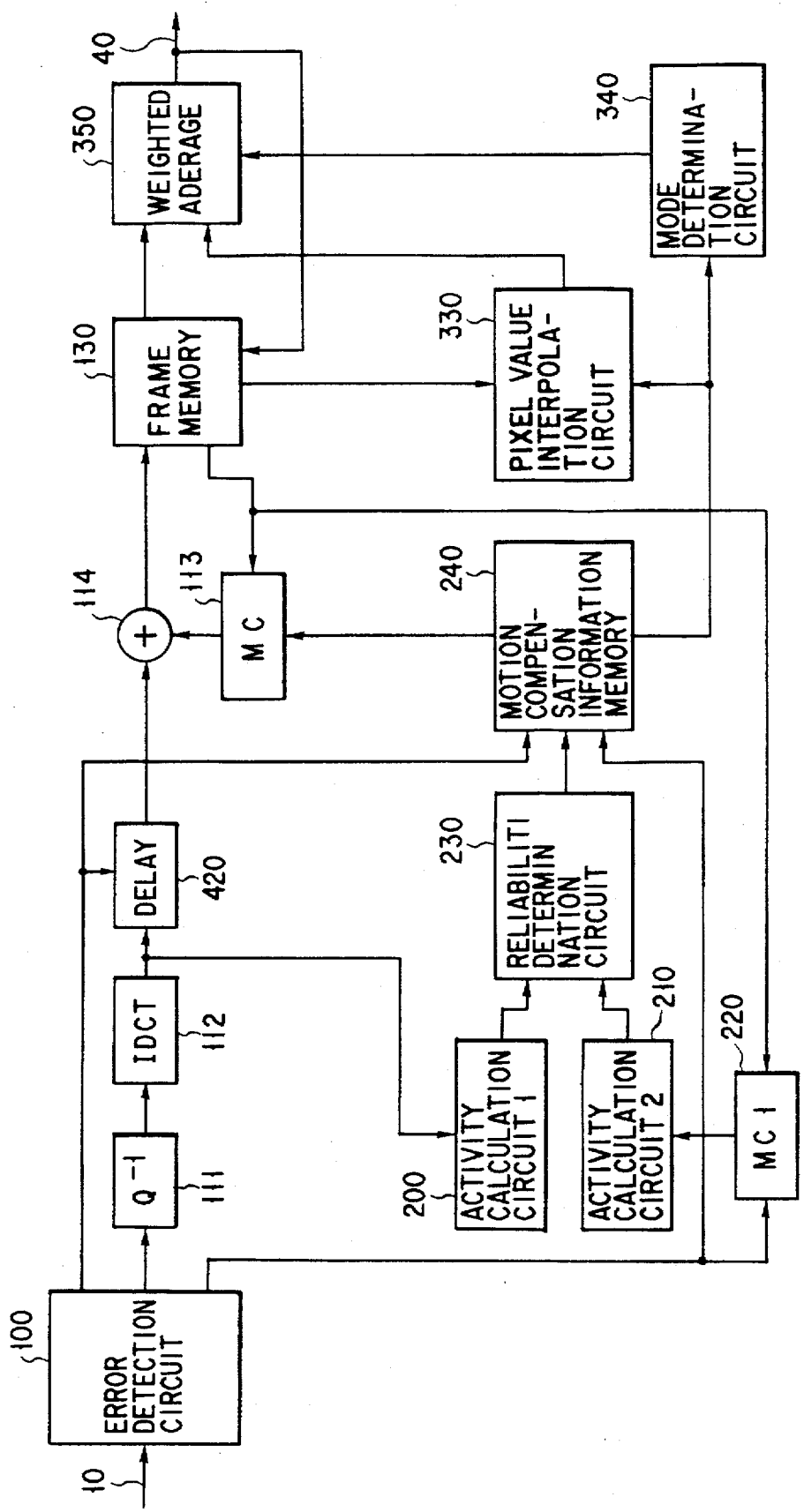
F I G. 27

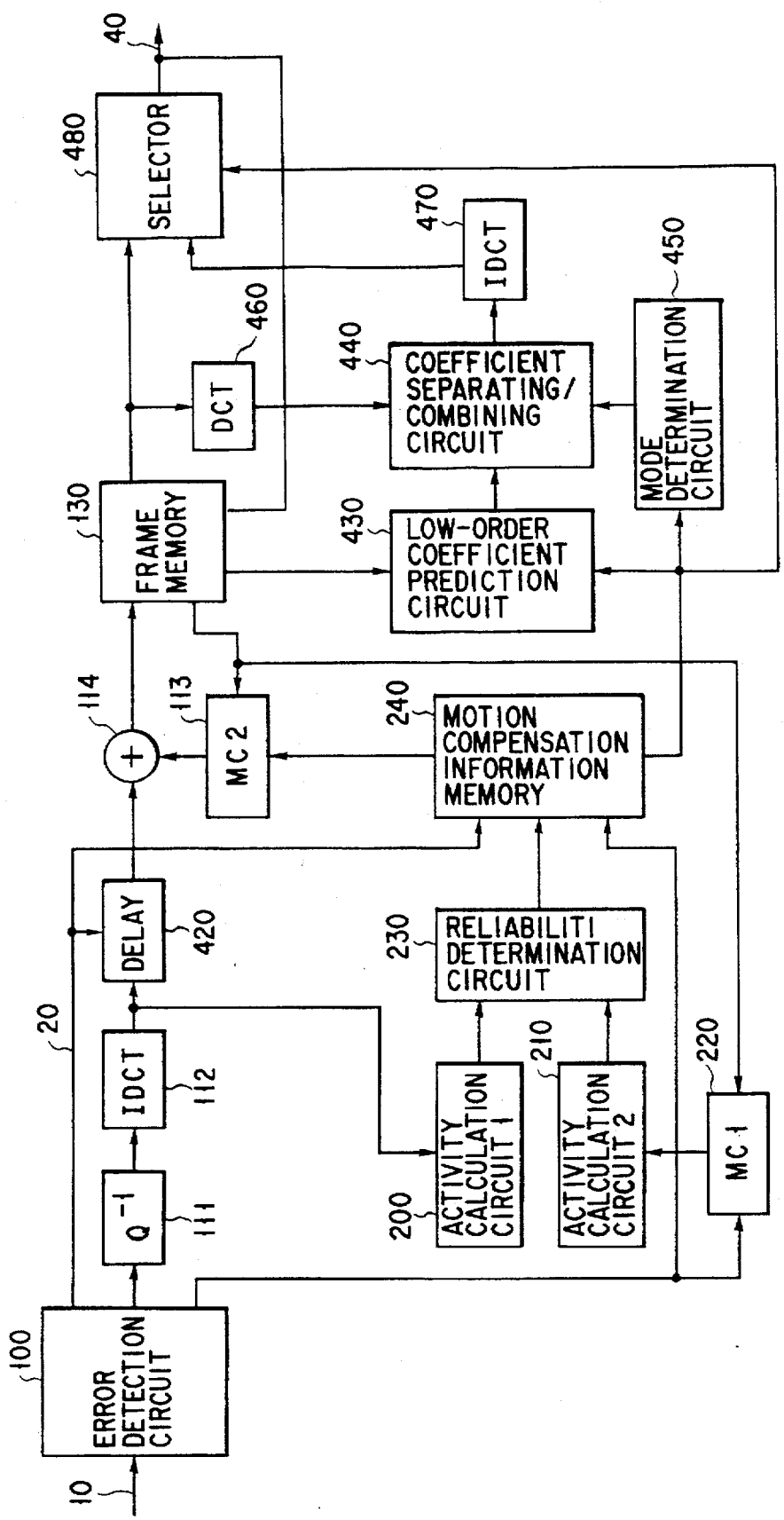
FIG. 28

MOTION PICTURE ERROR CONCEALMENT USING SIMPLIFIED MOTION COMPENSATION

CROSS-REFERENCES TO THE RELATED APPLICATIONS

This application is a continuation-in-part of U.S. patent application Ser. No. 08/202,269, filed Feb. 25, 1994, now abandoned.

BACKGROUND OF THE INVENTION

1. Field of the Invention

This invention relates to a motion picture transmission system for transmitting a motion picture signal, and more particularly to a motion picture image transmission system and method for coding and decoding the motion picture signal for applying the motion compensation prediction to each block unit of the motion picture signal.

2. Description of the Related Art

In a case where cell loss occurs when an image signal is packed into a packet such as a cell in an ATM network and transmitted, it becomes impossible to decode part of the image signal until synchronization of the variable-length code is restored. For this reason, large visual degradation occurs in the decoded image. Further, as described above, when an error occurs in a bit stream on the channel, the decoding operation cannot be effected until the synchronization is restored.

Therefore, in order to reduce image quality degradation due to the cell discarding or transmission error, an error compensation method is used. As one example of the error compensation method, a method for replacing a block which is made non-decodable on the receiver side by use of a decoded image signal is studied. In the following description, an error compensation method effected in the case of cell discarding is explained, but the same explanation as that for the error compensation method can be applied to the error compensation method used in the case of transmission error.

Generally, the cell discarding compensation technique for the motion picture image decoding apparatus using the motion compensation prediction can be realized by storing an image signal which is lost by the cell discarding into a frame memory or field memory and replacing the image signal by use of a desired image signal. The replacement is called concealment.

One example of the conventional cell discarding compensation method is explained with reference to FIG. 1. An image signal in a block A which is made impossible to be decoded (or which is made non-decodable) by the cell discarding in an encoded image is subjected to the concealment by use of a motion vector of a decodable block (for example a block B) which is adjacent to the block A. More specifically, the block A is subjected to the concealment by subjecting the image signal of a block A' in a reference image specified by a motion vector of the block B to the motion compensation prediction. That is, since the correlation of motion vector between adjacent blocks is generally high, deterioration in the image quality can be reduced by subjecting the block A which is made non-decodable by the cell discarding to the motion compensation prediction by use of the motion vector of the block B which is adjacent to the block A. For example, it is effected as follows in a system disclosed in Image Coding Symposium of Japan, 1992, (PCSJ92), 6-1, "ATM Image Coding System having Cell Discarding Resistance". That is, as shown in FIG. 2A, candidates (eight at maximum) of the motion vector used for the concealment are set around the block A. Next, weighted majority values of the motion vector are independently derived in the horizontal and vertical directions. Then, the block A is subjected to the concealment by effecting the motion compensation prediction by use of the motion vector taking the maximum value.

The weights used for the majority decision are set so as to permit the motion vector which is closer to the block A to be more easily selected as shown in FIG. 2B.

Further, in a case where the correlation of motion vector is low and the majority decision cannot be satisfactorily made, the number of candidates of the motion vector is increased as shown in FIG. 2C (14 at maximum) and then the majority decision is made again. In this case, for example, if the correlation of motion vector between the blocks 9, 11, 12 is high even when the correlation of motion vector between the adjacent blocks 1 to 8 around the block A is low, the block A is subjected to the concealment by use of the motion vector of one of the blocks 9, 11, 12. However, the correlation between the motion vector of the block A and the motion vector of the block 9, 11, or 12 is not always high. Therefore, if there is no correlation between the motion vectors of the adjacent blocks, it becomes difficult to select a motion vector used for the highly reliable concealment according to only the value of the motion vector.

Further, since the degree of freedom of the motion compensation prediction is increased when a plurality of motion compensation prediction modes are provided (for example, in MPEG, forward, backward and bi-directional predictions are provided. Refer to "International Standard of Multimedia Coding" by Hiroshi Yasuda, MARUZEN), it becomes difficult to select one candidate from eight candidates of the motion compensation prediction by majority decision.

Further, in Image Coding Symposium, 1991, (PCSJ91), 9-2, "Study of ATM Image Coding System", the concealment for the block A is effected by detecting the motion vector between the current block and an immediately preceding reproduced image with the upper and lower two blocks adjacent to the block A used as one set as shown in FIG. 3 and indirectly detecting the motion vector used for the motion compensation prediction of the block A. Thus, an adequate pixel value can be subjected to the concealment. However, in this method, a large amount of calculations for detecting the motion vector becomes necessary.

Further, in a case where cell discarding occurs in the first I picture of a sequence or where cell discarding occurs in an image using an image prior to occurrence of the scene-change as a reference image after the scene change occurred, no image data used for the concealment is present in the reference image so that the concealment using the motion compensation prediction described above cannot be effected. The I picture is an image for coding the entire block in the frame.

Specifically, in a case where cell discarding occurs in the first I picture of the sequence or where cell discarding occurs in an image (frame #n in FIG. 4A) subjected to the motion vector prediction by using an image (frame #n−1 in FIG. 4A) prior to occurrence of the scene change as a reference image, no image signal which can be used for the concealment or for the motion compensation is present so that the concealment based on the motion compensation cannot be effected.

Therefore, as shown in FIG. 4B, the concealment is effected by using a pixel value in a decodable block which is adjacent to a block (hatched block) which is made non-decodable by cell discarding and interpolating the pixel of the non-decodable block.

At this time, since the inter-frame correlation between the frame #n and the frame #n+1 of FIG. 4A is high when the motion compensation prediction error is substantially "0", the block subjected to the concealment by pixel interpolation in the frame #n on the receiver side has only an extremely narrow band component as shown in FIG. 5A when a wide-band block is made non-decodable by cell discarding, and a prediction error signal added thereto becomes substantially "0". As a result, the band of a reproduced image using the block subjected to the concealment as a reference in the frame #n+1 on the receiver side still contains only a low-frequency signal.

Further, since the high-frequency band component cannot be restored when the inter-frame correlation is high also in the succeeding frames, the block of narrow band partly remains. As a result, a problem that the visual deterioration remains in the succeeding frame occurs. In this case, hatched portions in FIGS. 5A to 5C indicate respective signal components.

Since the amount of information of an image using the first I picture of the sequence or image prior to occurrence of the scene change as a reference image occurring in the frames is large, the number of cells of image data of the frames is increased in comparison with the other frame and influence by the cell discarding becomes large.

On the other hand, in the conventional refresh process by use of intra-slice of intra-column, the searching range of the motion vector is limited so as not to refer to an image signal belonging to an area which is not refreshed as viewed from a refreshed area 2 in FIG. 6 when a block belonging to the area 2 is subjected to the motion compensation prediction. For this reason, when the concealment by use of the motion vector is effected on the receiver side, the highly reliable motion vector cannot be obtained.

For example, in Institute of Electronics and Information Communication Engineers of Japan at National Convention, Autumn 1992, D-162, "Study of Prediction Coding of Low Delay Inter-Frame", lines (inclined lines in FIG. 6) of blocks which are forcedly intra-frame coded are periodically set as shown in FIG. 6 to effect the refresh operation, and if rhomboid areas defined by the intra-slice are set as an area 1 and are 2 as shown in FIG. 6, the searching range of motion vector is limited so as to prevent the area 1 from being referred to when a block belonging to the area 2 is encoded. Each of the area 1 and area 2 includes the intra-slice of one period on the left side. Further, the periodic setting of lines is called intra-slice.

As a result, deterioration in the image quality caused by an error occurring in the area 1 can be suppressed. However, when the concealment for the block which is made non-decodable by occurrence of error is effected by use of the motion vector, the correlation between the motion vector whose searching range is limited and the actual movement of the block is not always high. Therefore, reduction in deterioration in the image quality by the concealment cannot be expected. Likewise, the same problem occurs when lines for intra-frame coding are forcedly set in the vertical direction instead of forcedly setting lines for inter-frame coding in the horizontal direction. The line setting is called intra-column.

As is disclosed in NIKKEI ELECTRONICS, May 10, 1993, (No. 580), pp. 63 to 64, a motion vector can be added to a macroblock to be inter-frame coded as a function of error resistance in MPEG2.

In the conventional compensation method for cell discarding and transmission line error, when candidates of motion compensation prediction adequate for the block which is made non-decodable are selected from the motion compensation predictions used for the adjacent blocks, a motion vector used for the concealment is selected by using the correlation of motion vector between the adjacent blocks and comparing only the values of motion vectors of the surrounding blocks. Therefore, when the correlation of motion vector between the adjacent blocks is small, it becomes difficult to select an adequate motion vector, thereby lowering the performance of cell discarding compensation.

Further, in a case where cell discarding occurs in the first I picture of the sequence or where cell discarding occurs in an image using an image prior to occurrence of the scene change as a reference image after the scene change occurred, no image data used for the concealment is present in the reference image so that the concealment using the motion compensation prediction described above cannot be effected. Further, since the amount of information in the frames is large in the first I picture of the sequence or in the image using an image prior to occurrence of the scene change as a reference image, the number of cells of image data of the above frames is increased in comparison with the other frames and the influence by the cell discarding becomes large.

In addition, in the conventional refresh process by use of intra-slice or intra-column, the searching range of the motion vector is limited so as not to refer to an image signal belonging to an area other than the refresh area when a block belonging to the refresh area is subjected to the motion compensation prediction so that the highly reliable motion vector cannot be obtained when the concealment by use of the motion vector is effected on the receiver side.

SUMMARY OF THE INVENTION

An object of this invention is to provide a motion picture image transmission system and method capable of effecting the motion compensation prediction with higher precision by selecting adequate candidates of motion compensation prediction even if the correlation of motion vector between a block which is made non-decodable and an adjacent block is low.

Further, another object of this invention is to provide a motion picture image transmission system and method for suppressing the influence of cell discarding and transmission line error on the first I picture of the sequence or an image using an image prior to occurrence of the scene change as a reference image after the scene change occurred and effecting the coding/decoding operation which makes it difficult to transmit the influence of deterioration in the image quality to the succeeding images even when cell discarding or transmission error occurs in the I picture or image after occurrence of the scene change.

In addition, still another object of this invention is to provide a motion picture image transmission system capable of effecting the refresh operation by the intra-slice or intra-column without limiting the searching range of the motion vector.

The above object can be attained by the following motion picture image transmission system. That is, in a motion picture image transmission system comprising a motion picture image transmitting apparatus for transmitting data obtained by coding a motion picture signal in the block unit by use of the motion compensation prediction and a motion picture image receiving apparatus for receiving the coded data and decoding the data in the block unit, the motion picture image receiving apparatus comprises error detection means for detecting an error of the coded data received and outputting an error detection signal; identifying means for identifying a block which is made non-decodable by the error and a decodable block according to the error detection signal; a selecting section for selecting the motion vector and motion compensation method applied to the block which is identified to be non-decodable by the identifying means from the motion vectors and motion compensation methods for a plurality of decodable blocks which lie near the block identified to be non-decodable; and correction means for correcting the block identified to be non-decodable by the identifying means by use of the motion vector and motion compensation method selected by the selecting section.

The above object can be attained by the following motion picture image transmission method. That is, in a motion picture image transmission method for transmitting data obtained by coding a motion picture signal in the block unit by use of the motion compensation prediction in a motion picture image transmission mode and receiving the coded data to decode the received data in the block unit in a motion picture image reception mode, the motion picture image transmission method effected in the motion picture image transmission mode comprises an error detection step of detecting an error of the coded data received and outputting an error detection signal; an identifying step of identifying a block which is made non-decodable by the error and a decodable block according to the error detection signal; a selecting step of selecting the motion vector and motion compensation method applied to the block which is identified to be non-decodable from the motion vectors and motion compensation methods for a plurality of decodable blocks which lie near the block identified to be non-decodable in the identifying step; and a correction step of correcting the block identified to be non-decodable in the identifying step by use of the motion vector and motion compensation method selected in the selecting step.

The above object can be attained by the following motion picture image transmission system. That is, in a motion picture image transmission system comprising a motion picture image transmitting apparatus for transmitting data obtained by coding a motion picture signal in the block unit and a motion picture image receiving apparatus for receiving the coded data and decoding the data in the block unit, the motion picture image transmitting apparatus comprises coding means having a mode in which the motion picture signal is intra-coded and a mode in which the motion picture signal is intra-coded by use of the motion compensation prediction; mode selection means for selecting the coding mode of the coding means to set a refresh area to be forcedly intra-coded in an image plane of the motion picture signal and move the refresh area for each image plane; and control means for changing the coding mode of the coding means to forcedly intra-code a block to be coded when a motion vector detected in the block is a motion vector which refers to an image signal before it is refreshed by the determining means in a case where the coding mode of the coding means is the inter-coding mode.

The present invention can be achieved by the following motion picture transmission system.

More specifically, a motion picture receiving apparatus for receiving data obtained by coding a motion picture signal in the block unit by use of the motion compensation and for decoding the received data in the block unit, comprising error detection means for detecting an error of the coded data received and outputting an error detection signal; identifying means for identifying a block being made non-decodable by the error; a motion compensation memory for storing data of an identification result of the identifying means and a motion compensation method; a generating section for generating data of the motion compensation method applied to the block being identified to be non-decodable by the identifying means from data of a plurality of decodable blocks lying near the block identified to be non-decodable; and correction means for correcting the block identified to be non-decodable by the identifying means based on information of the compensation method generated by the generating section by use of the motion compensation method.

More specifically, a motion picture receiving apparatus for receiving data obtained by coding a motion picture signal in the block unit by use of the motion compensation and for decoding the received data in the block unit, comprising: decoding means for decoding data which is made non-decodable received, detecting an error of the coded data outputting an error detection signal; identifying means for identifying a block being made non-decodable by the error; a motion compensation memory for storing data of an identification result of the identifying means and a motion compensation method; a generating section for generating data of the motion compensation method applied to the block being identified to be non-decodable by the identifying means from data of a plurality of decodable blocks lying near the block identified to be non-decodable; and correction means for correcting the block identified to be non-decodable by the identifying means by the motion compensation method by use of data of the motion compensation method generated by the generating section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram for illustrating the principle of the conventional packet discarding compensation;

FIGS. 2A to 2C are diagrams for illustrating the conventional motion vector selecting method;

FIG. 3 is a diagram for illustrating one example of the conventional packet discarding compensation;

FIGS. 4A and 4B are diagrams for illustrating the concealment by space interpolation in a frame;

FIGS. 5A to 5C are diagrams for illustrating the influence of the band of a frame #n on the transmission side of FIGS. 4A and 4B on the band of a frame #n+1 on the reception side;

FIG. 6 is a diagram for illustrating a process for setting intra-slice in the frame to limit the searching range of motion vector;

FIG. 7 is a block diagram showing the construction of a main portion of a motion picture image receiving apparatus according to a first embodiment of this invention;

FIGS. 8A to 8C are diagrams for illustrating data used for concealment;

FIGS. 9A and 9B are blocks diagram showing an example of the construction of an error detection circuit of FIG. 7;

FIG. 10 is a block diagram showing another example of the construction of a concealment circuit of FIG. 7;

FIG. 11 is a block diagram showing still another example of the construction of a concealment circuit of FIG. 7;

FIG. 12 is a block diagram showing the construction of a main portion of a motion picture image receiving apparatus according to a second embodiment of this invention;

FIG. 13 is a block diagram showing the construction of a main portion of a motion picture image receiving apparatus according to a third embodiment of this invention;

FIG. 14 is a block diagram showing another example of the construction of the motion picture image receiving apparatus according to the third embodiment of this invention;

FIG. 15 is a block diagram showing the construction of a main portion of a motion picture image receiving apparatus according to a fourth embodiment of this invention;

FIGS. 16A and 16B are diagrams for illustrating a DCT coefficient prediction method;

FIG. 17 is a block diagram showing another example of the construction of the motion picture image receiving apparatus according to the fourth embodiment of this invention;

FIG. 18 is a block diagram showing the construction of a main portion of a motion picture image transmitting apparatus according to a fifth embodiment of this invention;

FIG. 19 is a block diagram showing another example of the construction of the motion picture image transmitting apparatus according to the fifth embodiment of this invention;

FIG. 20 is a block diagram showing still another example of the construction of the motion picture image transmitting apparatus according to the fifth embodiment of this invention;

FIG. 21 is a block diagram showing another example of the construction of the motion picture image transmitting apparatus according to the fifth embodiment of this invention;

FIG. 22 is a block diagram showing still another example of the construction of the motion picture image transmitting apparatus according to the fifth embodiment of this invention;

FIG. 23 is a block diagram showing the construction of a main portion of a motion picture image transmitting apparatus according to a sixth embodiment of this invention;

FIG. 24 is a block diagram showing the construction of a main portion of a motion picture image transmitting apparatus according to a seventh embodiment of this invention;

FIG. 25 is a block diagram showing the construction of a main portion of a motion picture image transmitting apparatus according to an eighth embodiment of this invention;

FIGS. 26A to 26C are views explaining the motion compensation prediction of MPEG. 2, respectively;

FIG. 27 is a block diagram showing the construction of a main portion of a motion picture image transmitting apparatus according to a ninth embodiment of this invention; and FIG. 28 is a block diagram showing the construction of a main portion of a motion picture image transmitting apparatus according to a tenth embodiment of this invention.

DETAILED DESCRIPTION OF THE PREFERRED EMBODIMENTS

There will now be described an embodiment of this invention with reference to the accompanying drawings.

First, a motion picture image transmission system according to a first embodiment of this invention is explained. FIG. 7 is a block diagram showing a motion picture image receiving apparatus according to this embodiment.

The motion picture image transmitting apparatus according to this embodiment may be any type of coding apparatus for coding a motion picture image such as ITU-T (formerly, CCITT) recommendation H.262 in the block unit by use of motion compensation.

In this embodiment, the motion compensation prediction (a prediction mode such as front prediction and rear prediction and a motion vector) used in decodable blocks (blocks A to H in FIG. 8A) which are adjacent to a block (block X in FIG. 8A) which is made non-decodable by the packet discarding or transmission line error is set as a candidate of the motion compensation prediction used for concealment. Next, candidates of the respective motion compensation predictions are applied to pixel values in the blocks adjacent to the block X, a motion compensation prediction error value is calculated for each candidate, the motion compensation prediction having a minimum error evaluation value is selected from the candidates, and the motion compensation prediction is used to subject the block X to the concealment. The motion compensation prediction includes a prediction mode such as front prediction and rear prediction and a motion vector.

First, a concrete example of an error detection circuit 100 of FIG. 7 is explained with reference to FIG. 9.

As shown in FIG. 9A, when a packet is supplied via a line 10, the packet is disassemble in a packet resolving circuit 101, the bit stream is supplied to a demultiplexer/variable-length decoding circuit 102, and at the same time, packet discarding is detected from packet discarding identifying information (sequence number in an ATM cell) and packet discarding information is supplied to a non-decodability identifying information flag circuit 103. The packet discarding identifying information indicates a sequence number in the ATM cell.

The bit stream supplied to the demultiplexer/variable-length decoding circuit 102 is separated into a discrete cosine transform (DCT) coefficient and side information and then subjected to the variable-length decoding process. In this case, a signal (for example, a motion vector) of the bit stream which is supplied as difference data is restored into an original form and then supplied to a decoder 110. At this time, if an error is detected in the syntax of the bit stream, information thereof is supplied to the non-decodability identifying information flag circuit 103. As an example of the error in the syntax of the bit stream, an error that a code which is not present in the variable-length coding table appears may occur.

The non-decodability identifying information flag circuit 103 sets a non-decodability identifying information flag and an address in a block which is made non-decodable by an error detected in the packet resolving circuit 101 and demultiplexer/variable-length decoding circuit 102 and outputs the same via a line 20.

On the other hand, as shown in FIG. 9B, when the bit stream is supplied via the line 10, the bit stream in which a correctable error is corrected in the error correction circuit 104 is supplied to the demultiplexer/variable-length decoding circuit 102. The bit stream supplied to the demultiplexer/ variable-length decoding circuit 102 is separated into a discrete cosine (DCT) coefficient and side information and then subjected to the variable-length decoding process. In this case, a signal (for example, a motion vector) of the bit stream which is supplied as difference data is restored into an original form and then supplied to the decoder 110. At this time, if an error is detected in the syntax of the bit stream, a non-decodability identifying information flag is set into the ON state in an address of a block which is made non-decodable and output via the line 20. As an example of the error in the syntax of the bit stream, an error caused by insufficient correction or an error that a code which is not present in the variable-length coding table is caused by the error correction may occur.

In the decoder 110 of FIG. 7, the DCT coefficient supplied from the error detection circuit 100 is supplied to an inverse quantization circuit 111 and side information containing, for example, a motion vector and motion compensation prediction mode is supplied to a motion compensation prediction circuit 113 and a motion compensation information memory 120 via a line 30.

The inverse quantization circuit 111 supplies the DCT coefficient which is inversely quantized to an inverse DCT circuit 112. On the other hand, the motion compensation prediction circuit 113 reads out a reference image signal from a frame memory 130 via a line 40 according to a motion compensation prediction mode for each block, creates a prediction value and supplies the same to an adder 114. In this case, in the block of intra-frame coding mode, the prediction value input to the adder 114 is set to "0". The adder 114 adds a prediction error supplied from the inverse DCT circuit 112 to a prediction error supplied from the motion compensation prediction circuit 113 and supplies the result of addition to the frame memory 130 via a line 50.

The decoder used in this embodiment may be constructed with another construction if it includes the motion compensation prediction circuit 113.

When a block X shown in FIG. 8 is subjected to the concealment by use of information of the blocks A to H in a concealment circuit 140, a value of a motion vector and motion compensation prediction mode supplied via the line 30 for the blocks hatched in FIG. 8A and a non-decodability identifying information flag supplied from the error detection circuit 100 via the line 20 are stored in the motion compensation information memory 120. Further, an image signal of the blocks hatched in FIG. 8A is stored in the frame memory 130. That is, a signal of the block X is delayed until decoding of the block H is completed and a signal of the block H is stored in the motion compensation information memory 120 and frame memory 130 and then it is subjected to the concealment and output. However, the non-decodability identifying information flag is supplied via the line 20 and it is not necessary to rewrite the motion compensation information and image data of a block which is identified to be non-decodable.

The concealment circuit 140 creates a prediction value for a value of a pixel near the block X from a reference image read out from the frame memory 130 by use of motion compensation information of a decodable block among the blocks A to H which is stored in the motion compensation information memory 120 and which is not an intra-frame coding block in a first motion compensation circuit 141 and supplies the same to an error evaluation value calculating circuit 142.

The motion compensation error evaluation circuit (which is hereinafter referred to as an MC error evaluation circuit) 142 reads out a reproduced image of a pixel near the block X from the frame memory 130. Then, the MC error evaluation circuit 142 calculates an error evaluation value between the readout reproduced image and a prediction value of a pixel near the block X supplied from the first motion compensation prediction circuit 141 and supplies the error evaluation value to a selection circuit 143. The error evaluation value is the absolute-value sum or square-value sum of error signals. In this case, the motion compensation prediction error of a pixel contained in a non-decodable block among the pixels near the block X is not evaluated.

The selection circuit 143 selects a motion compensation prediction having a minimum error evaluation value supplied from the MC error evaluation circuit 142, reads out corresponding motion compensation information from the motion compensation information memory 120 and supplies the same to a second motion compensation circuit 144.

The second motion compensation circuit 144 creates a motion compensation prediction value (concealment image) of the block X based on a reference image signal read out from the frame memory 130 by use of optimum motion compensation prediction selected by the selection circuit 143 and supplies the same to a selector 150. In a case where motion compensation information cannot be derived since the block which is adjacent to the block X cannot be decoded or is not set in the motion compensation mode, image data of a block lying in the same position as the block X in the reference image and stored in the frame memory 130 may be read out and supplied to the selector 150, for example. The fact that the motion compensation mode is not set indicates that the intra-frame coding mode is set, for example.

If the block (block X) is detected to be a decodable block by the non-decodability identifying information flag supplied from the motion compensation information memory 120, the selector 150 outputs a signal corresponding to the block X stored in the frame memory 130 via a line 60, and if the block is a non-decodable block, it outputs a concealment image supplied from the second motion compensation prediction circuit 144 via the line 60. In this case, after coding of the block H is completed and information thereof is stored into the frame memory 130 and motion compensation information memory 120, an image of the block X is delayed and output from the selector 150 via the line 60.

As described above, an error-compensated image signal output via the line 60 is stored in the frame memory 130 as a reference image of a next frame.

The hardware scale can be reduced by using a set of pixels (a pixel group having a large correlation between the pixels) lying near the block X as shown in FIG. 8B instead of evaluating the motion compensation prediction error values of all of the pixels contained in the blocks A to H as pixels near the block X in the above embodiment. However, since the influence of the error is transmitted in the horizontal direction, the possibility that the blocks D and E are also made non-decodable becomes high when the block X is made non-decodable by the error and therefore it is preferable not to evaluate the error only by use of the pixels in the above blocks.

As another example of the concealment circuit 140, the following circuit may be used. That is, as shown in FIG. 10, a pixel value interpolation circuit 145 and a mode determination circuit 146 are provided, an output obtained by subjecting the block X to the motion compensation prediction in the second motion compensation circuit 144 in the same manner as in the above embodiment and an output obtained by subjecting the block X to the interpolation prediction by use of pixels near the block X in the pixel value interpolation circuit 145 are supplied to a selector 147, and an output which is determined to be adequate for concealment of the block X in the mode determination circuit 146 is output via the selector 147. More specifically, in the pixel value interpolation circuit 145, for example, values of pixels of the blocks A to H which are adjacent to the block X and stored in the frame memory 130 are read out from the frame memory 130 and an interpolated image is created by weighting and interpolating the pixel values in the block X by linear coupling of the pixel values according to the distance between the pixels. In this case, the values of pixels adjacent to the block X indicate n (n is an integer) pixels (pixels hatched in FIG. 8C) for each block when the block size is n×n pixels. The values of pixels in the decodable blocks are not used for creating an interpolated image of the block X. As the interpolated image creating method of the block X, another interpolation method effected by use of average values of the surrounding blocks may be used. Further, in the mode determination circuit 146, a signal for selecting an output of the pixel value interpolating circuit 145 is supplied to the selector 147 in a predetermined case, for example, in a case where all of the motion compensation modes of the decodable blocks stored in the motion compensation information memory 120 are the intra-frame coding mode.

As another method for setting pixels whose motion compensation error values are evaluated, it is possible to provide an attribute determination circuit 148 in the concealment circuit 140 as shown in FIG. 11, detect the luminance gradient (for example, edge) of the pixel group for evaluating the motion compensation error value in the circuit 148 and derive the motion compensation prediction error evaluation value by the first motion compensation prediction circuit 141 and MC error evaluation circuit 142 by use of the pixel group in an area (for example, an edge portion) in which the luminance gradient is large. As a concrete example, a method for detecting an edge in the blocks A to H and evaluating the motion compensation prediction error by use of the pixels in the block containing the edge may be used. Further, like the embodiment of FIG. 10, it is possible to selectively use one of an output of the second motion compensation prediction circuit 144 and an output of the pixel value interpolation circuit 145.

As described above, in the first embodiment, the motion compensation prediction applied to the decodable blocks (blocks A to H in FIG. 2A) which are adjacent to the block (block X in FIG. 2A) which is made non-decodable by packet discarding or transmission line error is set as a candidate of the motion compensation prediction used at the time of concealment of the block, and when adequate motion compensation prediction applied to the block is selected, a signal of a decodable block is used to calculate the motion compensation prediction error of each candidate and select a motion compensation prediction whose error evaluation value becomes minimum.

As a result, according to the first embodiment, even if the correlation of motion vector between the adjacent blocks is small, an adequate one of the candidates of motion compensation prediction is selected. Therefore, the prediction precision of the image obtained by subjecting the non-decodable block to the concealment can be enhanced.

Next, a motion picture image transmission system according to a second embodiment of this invention is explained. FIG. 12 is a block diagram showing a motion picture receiving apparatus according to this embodiment.

In FIG. 12, like the first embodiment, an error detection circuit 100 separates coded data supplied via a line 10 into a discrete cosine transform (DCT) coefficient and side information and then subjects the same to the variable-length decoding. The variable-length decoded DCT coefficient is supplied to an inverse quantization circuit 111 and motion compensation information such as a motion vector (which is hereinafter referred to as MV) is supplied as the variable-length decoded side information to a first motion compensation prediction circuit 220 and motion compensation information memory 240. Further, an address and a non-decodability identifying information flag are set in a block which is made non-decodable and output via a line 20.

The inverse quantization circuit 111 supplies an inversely quantized DCT coefficient to an inverse quantization circuit 112. A prediction error signal output from the inverse quantization circuit 112 is supplied to a first activity calculation circuit 200 and the activity of the prediction error signal is calculated. In this case, the activity of the prediction error signal is the square-value sum or absolute-value sum of signals obtained by separating the average value.

A reliability determination circuit 230 is supplied with the activity of the prediction error signal and the activity of the prediction signal which are calculated in the activity calculating circuits 200 and 210 so as to determine the reliability of MV. For example, when the luminance gradient of the prediction signal is small even if the electric power of the prediction error signal is small, there occurs a possibility that detection miss of MV is caused by the influence of noise at the time of detection of MV on the transmission side. On the other hand, when the luminance gradient of the prediction signal is large, the reliability of MV is high if the electric power of the prediction error signal is extremely large. Therefore, assuming that the reliability of MV becomes higher as the ratio E/P of the activity E (output of 200) of the prediction error signal to the activity P (output of 210) of the prediction signal becomes smaller, the value is supplied to the motion compensation information memory 240.

When motion compensation information of a block X shown in FIG. 8 is estimated by use of motion compensation information of blocks A to H, the value of motion vector and motion compensation prediction mode supplied via the line 30, a non-decodability identifying information flag supplied from the error detection circuit 100 via the line 20 and the reliability of MV supplied from the reliability determination circuit 230 are stored into the motion compensation information memory 240 for the blocks hatched in FIG. 8A. In this case, if the corresponding block (block X) is a decodable block, the motion compensation information of the block us supplied to the second motion compensation prediction circuit 113, and if the corresponding block is a non-decodable block, the motion compensation information of one of the blocks A to H which has MV of highest reliability is supplied to the second motion compensation prediction circuit 113. Further, it is also possible to supply the average value of MV of highest reliability and MV of second highest reliability to the second motion compensation prediction circuit 113.

The second motion compensation prediction circuit 113 reads out a reference image signal from the frame memory 130 according to the motion compensation prediction mode supplied from the motion compensation information memory 240 for each block, creates a prediction value and supplies the same to an adder 114. However, in a block of inter-frame coding mode, the prediction value input to the adder 114 is set to "0".

When the adder 114 is supplied with the value of the block X from the second motion compensation prediction circuit 113, an output of the inverse DCT circuit 112 is delayed in a delay circuit 250 until values up to the block H are stored into the motion compensation information memory 240, and then, it adds the values together and supplies the result of addition to the frame memory 130. However, if the block is a non-decodable block, the value of the prediction error signal is reset in the delay circuit 250.

As described above, in the second embodiment, the motion compensation prediction used in the decodable blocks (blocks A to H in FIG. 2A) which are adjacent to the block (block X in FIG. 2A) which is made non-decodable by packet discarding or transmission line error is set as a candidate of the motion compensation prediction used at the time of concealment of the corresponding block, the reliability of the motion compensation is evaluated by calculating the ratio of the activity of the motion compensation prediction error signal in the decodable block adjacent to the corresponding block to the activity of the motion compensation prediction signal at the time of selection of adequate motion compensation prediction used in the corresponding block, and motion compensation prediction having the highest reliability is selected.

Thus, according to the second embodiment, even if the correlation of motion vector between adjacent blocks is small, an adequate one of the candidates of motion compensation prediction can be selected. Therefore, the prediction precision of an image obtained by subjecting the non-decodable block to the concealment can be enhanced.

Next, a motion picture image transmission system according to a third embodiment of this invention is explained. FIG. 13 is a block diagram showing a motion picture image receiving apparatus according to this embodiment.

In FIG. 13, like the first embodiment, an error detection circuit 100 separates coded data supplied via a line 10 into a discrete cosine transform (DCT) coefficient and side information and then subjects the same to the variable-length decoding. The DCT coefficient is supplied to an inverse quantization circuit 111, and motion compensation information such as MV is supplied to a motion compensation information memory 300. Further, an address and a non-decodability identifying information flag are set in a block which is made non-decodable and output via a line 20.

When motion compensation information of a block X shown in FIG. 8 is estimated by use of motion compensation information of blocks A to H, the value of a motion vector and motion compensation prediction supplied via a line 30 and the non-decodability identifying information flag supplied from the error detection circuit 100 via the line 20 are stored into the motion compensation information memory 300 for the blocks hatched in FIG. 8A. In this case, if the corresponding block (block X) is a decodable block, a motion compensation estimation circuit 310 selects the motion compensation information of the corresponding block, and if the corresponding block is a non-decodable block, it selects adequate motion compensation information from the motion compensation information of the blocks A to H stored in the motion compensation information memory 300, and supplies the motion compensation information to the motion compensation prediction circuit 113.

The inverse quantization circuit 111 supplies an inversely quantized DCT coefficient to an inverse DCT circuit 112. Like the second embodiment, a prediction error signal output from the inverse DCT circuit 112 is delayed in a delay circuit 350, then supplied to an adder circuit 114 and added together with a prediction signal supplied from a motion compensation prediction circuit 113, and then supplied to a frame memory 130. In this case, the prediction error signal of the non-decodable block is set to "0" in the delay circuit 320.

Like the circuit of FIG. 10 explained in the first embodiment, a pixel value interpolation circuit 330 reads out values of pixels of the blocks A to H which are adjacent to the block X and stored in the frame memory 130 from the frame memory 130, for example, creates an interpolated image by weighting and interpolating the pixel values in the block X by linear coupling of the pixel values according to the distance between the pixels, and supplies the same to a weighted average circuit 350. The above adjacent pixel values indicate n pixels for each block when the block size is n×n pixels.

The weighted average circuit 350 calculates a weighted average value of a signal supplied from the frame memory 130 and an interpolation signal supplied from the pixel value interpolation circuit 330 based on a signal supplied from the mode determination circuit 340.

For example, in the mode determination circuit 340, if the block X stored in the motion compensation information memory 300 is determined to be a decodable block, an input from the frame memory 130 is output via the line 40 and supplied to the frame memory 130. Further, in the mode determination circuit 340, if it is determined that the block X stored in the motion compensation information memory 300 is a non-decodable block and all of the motion compensation modes of the decodable blocks among the blocks A to H which are adjacent to the block X are the intra-frame coding mode, an input from the pixel value interpolation circuit 330 is output via the line 40 and supplied to the frame memory 130. Further, in the mode determination circuit 340, the average value of the input from the frame memory 130 and the input from the pixel value interpolation circuit is calculated in the weighted average circuit 350, then output via the line 40 and supplied to the frame memory 130.

As described above, even if the correlation of low-frequency component between a non-decodable block and an adjacent block is small and block-form distortion occurs when the non-decodable block is subjected to the concealment by motion compensation, the block-form distortion can be reduced by deriving an average of the signal thereof and a signal whose boundary portion is smoothly connected to the adjacent block and created in the pixel value interpolation circuit 330.

Further, in a case where the concealment circuit 140 shown in FIG. 10 is changed as shown in FIG. 14 and it is determined in the mode determination circuit 146 that all of the motion compensation modes of the decodable blocks among the blocks A to H adjacent to the block X are the intra-frame coding mode, an input from the pixel value interpolation circuit 330 is output to the selector 150, and in other cases, the same effect can be attained by calculating the average value of the input from the frame memory 130 and the input from the pixel value interpolation circuit in the weighted average circuit 350 and outputting the same to the selector 150.

As described above, in the third embodiment, in the concealment method using the motion compensation prediction of adjacent blocks, a weighted average value of a prediction signal created by subjecting the block which is made non-decodable by the packet discarding or transmission line error to the motion compensation prediction by using the selected adequate motion vector and motion compensation method and an interpolation prediction signal created by subjecting the pixel values in the block to the interpolation prediction by using a plurality of pixel values near the block is used as an image signal of the block.

Thus, according to the third embodiment, the block-shaped distortion which may be caused by discontinuity of the low-frequency component between the adjacent blocks can be reduced.

Next, a motion picture image transmission system according to a fourth embodiment of this invention is explained. FIG. 15 is a block diagram showing a motion picture image receiving apparatus according to this embodiment.

In FIG. 15, like the first embodiment, an error detection circuit 100 separates coded data supplied via a line 10 into a discrete cosine transform (DCT) coefficient and side information and then subjects the same to the variable-length decoding. The error detection circuit 100 supplies the DCT coefficient of the coded data which is subjected to the variable-length decoding to an inverse quantization circuit 111 and supplies motion compensation information such as MV among the coded data which is subjected to the variable-length decoding to a motion compensation information memory 400. Further, the error detection circuit 100 sets an address and a non-decodability identifying information flag in a block which is made non-decodable and outputs the same via a line 20.

When motion compensation information of a block X shown in FIGS. 8A to 8C are estimated by use of motion compensation information of blocks A to H, the value of a motion vector and motion compensation prediction mode supplied via a line 30 and the non-decodability identifying information flag supplied from the error detection circuit 100 via the line 20 are stored into the motion compensation information memory 300 for the blocks hatched in FIG. 8A. In this case, if the corresponding block (block X) is a decodable block, a motion compensation estimation circuit 410 selects the motion compensation information of the corresponding block, and if the corresponding block is a non-decodable block, it selects adequate motion compensation information from the motion compensation information of the blocks A to H stored in the motion compensation information memory 400, and supplies the motion compensation information to the motion compensation prediction circuit 113.

The inverse quantization circuit 111 supplies an inversely quantized DCT coefficient to an inverse DCT circuit 112. Like the second embodiment, a prediction error signal output from the inverse DCT circuit 112 is delayed in a delay circuit 420, then supplied to an adder circuit 114 and added together with a prediction signal supplied from a motion compensation prediction circuit 113, and then supplied to a frame memory 130. In this case, the prediction error signal of the non-decodable block is set to "0" in the delay circuit 420.

As is disclosed in the document by H. Sun, K. Challapali, J. Zdepski, "ERROR CONCEALMENT IN DIGITAL SIMULCAST AD-HDTV DECODER", IEEE Trans. Consumer Electronics Vol. 38, No. 3, August 1992 (refer to FIG. 16), a low-order coefficient prediction circuit 430 predicts low-order coefficients (AC01, AC10, AC02, AC20) of a DCT block corresponding to DC5 by using the average value of DCT blocks (DC1 to DC9) under a condition that the amplitude variation on the image plane is approximated by a quadratic surface. If a macroblock containing DC5, DC6, DC8, DC9 is not decodable, it is subjected to the bilinear interpolation prediction by use of the values of DC (such as DC2, DC3) in the adjacent macroblock. Broken lines in FIG. 16 indicate the boundary between the DCT blocks and the solid lines indicate the boundary between the macroblocks.

A coefficient separating/combining circuit 440 is operated according to the determining operation of a mode determining circuit 450. That is, when the mode determining circuit 450 determines that all of the motion compensation modes of the non-decodable blocks among the blocks A to H which are adjacent to the block X and stored in the motion compensation information memory 400 are the intra-frame coding mode, the coefficient separating/combining circuit 440 outputs only an input from the low-order coefficient prediction circuit 430. Further, when the mode determination circuit 450 makes a different determination, the coefficient separating/combining circuit 440 transforms a signal of the block X read out from the frame memory 130 into a DCT coefficient and outputs a signal having the low-order coefficient of the trans-formed signal used instead of the coefficient supplied from the low-order coefficient prediction circuit 430.

An output of the coefficient separating/combining circuit 440 is inversely transformed in an inverse DCT circuit 470 and then supplied to a selector 480. The selector 480 outputs a signal of the block X supplied from the frame memory 130 via a line 40 if the block X is a decodable block, and outputs a signal supplied from the inverse DCT circuit via the line 40 and supplies an output of the line 40 to the frame memory 130 if the block X is a non-decodable block.

As described above, when the decodable block is subjected to the concealment by use of motion compensation and even if the correlation of low-frequency component with respect to the adjacent block is small and block-form distortion occurs, the block-form distortion can be reduced since the low-order coefficient of DCT is replaced by a coefficient which is made by prediction to smoothly couple the adjacent block to the block boundary portion in the low-order coefficient prediction circuit 430.

Further, the concealment circuit 140 shown in FIG. 10 can be modified as shown in FIG. 17. With this modification, the coefficient separating/combining circuit 440 outputs an input from the low-order coefficient prediction circuit 430 as it is when the mode determining circuit 146 determines that all of the motion compensation modes of the non-decodable blocks among the blocks A to H which are adjacent to the block X are the intra-frame coding mode. Further, when the mode determination circuit 146 does not make the above determination (that is, it makes a different determination), the coefficient separating/combining circuit 440 derives the low-order coefficient of a signal obtained by transforming a signal of the block X read out from the frame memory 130 into a DCT coefficient by use of the DCT circuit 460, outputs a signal having the above low-order coefficient of the transformed signal used instead of the coefficient supplied from the low-order coefficient prediction circuit 430, then inversely transforms the above signal in the inverse DCT circuit 470 and outputs the same to the selector 150. In this case, the same effect as described above can be obtained.

The low-order coefficient prediction circuit 430, DCT circuit 460, inverse DCT circuit 470 can be replaced by a circuit designed for orthogonal transform other than DCT or band division filter.

As described above, according to the fourth embodiment, in the concealment method using the motion compensation prediction of an adjacent block, the high frequency component of a prediction signal created by subjecting the block which is made non-decodable by the packet discarding or transmission line error to the motion compensation prediction by using the selected adequate motion vector and motion compensation method is combined with the low frequency component of an interpolation prediction signal created by subjecting the pixel values in the block to the interpolation prediction by using a plurality of pixel values near the block so as to construct an image signal of entire band width which is used as an image signal of the block.

Thus, according to the fourth embodiment, the block-form distortion which may be caused by discontinuity of the low-frequency component between the adjacent blocks can be reduced.

Next, a motion picture image transmission system according to a fifth embodiment of this invention is explained. FIG. 18 is a block diagram showing a motion picture image transmitting apparatus according to this embodiment.

In FIG. 18, an input image is stored into a plurality of frame memories 500. A motion vector detection circuit 510 detects a motion vector between the frames stored in the frame memories 500 and then supplies the absolute-value sum (derived at the time of detection of the motion vector) of error signals and a signal for identifying whether the frame can be used as a reference image for subjecting another frame to the motion compensation to a scene change detection circuit 520 for each block, The scene change detection circuit 520 calculates the activity (for example, the absolute-value sum of the A.C. components) of an input image supplied from the frame memory 500 and compares the activity with the absolute-value sum of error signals supplied from the motion vector detection circuit 510. In this case, if the number of blocks in which the latter value becomes larger than the former value is larger than a half of the total number of blocks in the frame, for example, it is determined that the scene change has occurred, and if the frame is used as a reference image for another frame, it supplies a scene change identifying signal to a resolution converting circuit 530 and an encoder 540. The scene change detection method is not limited to the above method and another method may be used.

The resolution converting circuit 530 passes the frame through a low-pass filter of 0-order phase to lower the resolution thereof and then supplies an image signal thus obtained to the encoder 540 in a case where the scene change identifying signal supplied from the scene change detection circuit 520 is enable.

The encoder 540 divides the image signal supplied from the resolution converting circuit 530 into blocks, effects the motion compensation prediction coding operation for each block by use of a motion vector supplied from the motion vector detection circuit 510, and then outputs a coded image signal.

As another method for lowering the spatial resolution of a frame immediately after occurrence of the scene change, instead of lowering the space resolution by use of the resolution converting circuit 530, it is possible to lower the space resolution as shown in FIG. 21 by causing the encoder 560 to subject all of the blocks of the frame to the intra-frame coding, cut off the high-order coefficient and code only the low-order coefficient as shown in FIG. 16B, for example, in a case where the scene change identifying signal supplied from the scene change detection circuit 520 is enable. Further, the scene change identifying flag (1 bit) may be added to each frame.

Likewise, in FIG. 19, in a case where the scene change identifying signal supplied from the scene change detection circuit 520 is enable, in a dynamic range converting circuit 535 instead of the resolution converting circuit 530, an image signal obtained by lowering the dynamic range of the frame according to the following equation is supplied to the encoder 540.

$$x' = (x-128)+128$$

$$0 < < 1$$

where x indicates a pixel value of the frame and x' indicates a pixel value obtained after the dynamic range is lowered.

As another method for lowering the dynamic range, it is possible to use an average value of x instead of 128 in the above equation. The average value may be an average value for the entire portion of the frame or an average value for a small area including x.

Further, it is possible to limit the dynamic range of the amplitude value by use of a limiter instead of multiplying the amplitude value by.

The band and area in which the dynamic range is lowered may be the entire portion of the frame or an area in which a significant amount of information will be lost by spatial interpolation. In the latter case, since it is necessary to detect an edge portion or an area in which the power of high frequency component is large, it is preferable to additionally provide an edge portion detection circuit 550 as shown in FIG. 20. In this case, the edge portion detection circuit 550 detects an edge portion by passing a signal of the frame supplied from the frame memory 500 through the edge detection filter and supplies a signal for identifying an area containing the edge portion to the dynamic range converting circuit 535. The dynamic range converting circuit 535 lowers the dynamic range only for an area which is determined to be an edge portion.

The motion picture image receiving apparatus can be realized if it is constructed in the same manner as in the first to fourth embodiments. For example, in the mode determination circuit 146 of FIG. 10, it is determined that a scene change has occurred when all of the decodable blocks among the blocks A to H are intra-frame coded blocks and a signal from the pixel value interpolation circuit 145 may be output via the selector 147. Further, as shown in FIG. 22, the mode determination circuit 146 may be constructed to supply a signal to cause the selector 147 to output an input from the pixel value interpolation circuit 145 without fail when a scene change identifying flag is transmitted from the transmission side.

As described above, according to the fifth embodiment, since the high frequency component remains in a motion compensation prediction error signal if the resolution of an image (frame #n) to which the concealment method using the motion compensation prediction of the adjacent blocks cannot be applied is lowered by using a low-pass filter of 0-order phase as shown in FIG. 5B, for example, the reproduced image for a next image (frame #n+1) becomes a signal of wide band such as an original signal by adding the motion compensation prediction error signal even if the bandwidth of the space-interpolated block is narrow. Alternatively, the reproduced image for a next image (frame #n+1) becomes a signal of wide band such as an original signal by reducing the dynamic range of the image as shown in FIG. 5C. Further, in a case as shown in FIG. 5A in the prior art, the generated amount of codes in the frame #n is large, but in a case as shown in FIGS. 5B and 5C, since the amount of generation codes is divided into the frames #n and #n+1, the number of cells filled with image data of the frame #n is reduced and the influence of the cell discarding and transmission line error can be suppressed.

Next, a motion picture image transmission system according to a sixth embodiment of this invention is explained.

FIG. 23 is a block diagram showing a motion picture image transmitting apparatus according to this embodiment.

In FIG. 23, an input image is stored into a plurality of frame memories 500.

A motion vector detection circuit 510 detects a motion vector between the frames stored in the frame memories 500 and then supplies the absolute-value sum (derived at the time of detection of the motion vector) of error signals and a signal for identifying whether or not the frame can be used as a reference image for subjecting another frame to the motion compensation to a scene change detection circuit 520 for each block.

The scene change detection circuit 520 calculates the activity (for example, the absolute-value sum of the A.C. components) of an input image supplied from the frame memory 500 and compares the activity with the absolute-value sum of error signals supplied from the motion vector detection circuit 510. In this case, if the number of blocks in which the latter value becomes larger than the former value is larger than a half of the total number of blocks in the frame, for example, it is determined that the scene change has occurred, and if the frame is used as a reference image for another frame, it supplies a scene change identifying signal to an encoder 600. An edge portion detection circuit 550 detects an edge portion by passing a signal of the frame supplied from the frame memory 500 through the edge detection filter and supplies a signal for identifying whether or not the block belongs to an area containing the edge portion to the encoder 600 for each block.

The encoder 600 divides the image signal supplied from the frame memory 500 into blocks, effects the motion compensation prediction coding operation for each block by use of a motion vector supplied from the motion vector detection circuit 510, and then outputs a coded image signal. In this case, if the scene change identifying signal supplied from the scene change detection circuit 520 becomes enable (for example, frame #n in FIG. 4A), all of the blocks in the frame are subjected to the intra-frame coding process. Further, in a frame (for example, frame #n+1 in FIG. 4A) using the above frame as a reference image for the motion compensation prediction, a block of the frame which is determined to belong to the edge portion in the edge detection circuit 550 is forcedly subjected to the intra-frame coding process.

The motion picture image receiving apparatus can be realized if it is constructed in the same manner as in the first to fourth embodiments. For example, in the mode determination circuit 146 of FIG. 10, it is determined that a scene change has occurred when all of the decodable blocks among the blocks A to H are intra-frame coded blocks, and a signal from the pixel value interpolation circuit 145 may be output via the selector 147. Further, as shown in FIG. 22, the mode determination circuit 147 may be constructed to supply a signal to cause the selector 147 to output an input from the pixel value interpolation circuit 145 without fail when a scene change identifying flag is transmitted from the transmission side.

Thus, for example, even if cell discarding occurs in the frame #n of FIG. 4A and the space resolution is lowered by the concealment by space interpolation to blur the edge portion, the edge blur can be prevented by forcedly intra-frame coding the edge portion in the frame #n+1.

In the first to seventh embodiments, if the input image is an interlace signal, the type of concealment may be changed for each field.

In all of the embodiments (first to sixth embodiments), when the embodiments are applied to MPEG, the circuit scale for the motion compensation circuit (141, 144, 22) relating to the concealment can be reduced by omitting the pixel average value calculating circuit which is required for ½ pixel motion compensation or interpolation prediction mode of B picture (for example, by effecting the concealment by using only the front prediction when the interpolation prediction mode of B picture for reducing the motion vector to one pixel unit is selected). Omission of the pixel average value calculating circuit means that the concealment is effected by using only the front prediction when the interpolation prediction mode of B picture for rounding the motion vector to one pixel unit is selected, for example.

As described above, according to the sixth embodiment, even if the space resolution is lowered by the concealment by space interpolation to blur the edge portion in an image (frame #n in FIG. 22A) to which the concealment method using the motion compensation prediction of the adjacent blocks cannot be applied, the edge blur can be prevented by forcedly intra-frame coding the edge portion in the next frame (frame #n+1).

Next, a motion picture image transmission system according to a seventh embodiment of this invention is explained. FIG. 24 is a block diagram showing a motion picture image transmitting apparatus according to this embodiment.

In FIG. 24, a video signal supplied for each frame is stored into a first frame memory 700. A motion vector detection circuit 710 detects MV stored in the first frame memory 700 and a second frame memory 720 which stores local decoding images and supplies the same to a motion compensation prediction circuit 730. The motion compensation prediction circuit 730 creates a prediction image signal from the second frame memory 720 by use of MV supplied from the motion vector detection circuit 710 and supplies the same to a coding control circuit 740 and intra-frame/inter-frame switching circuit 750.

The intra-frame/inter-frame switching circuit 750 supplies an optimum prediction value to a subtracter 760 and adder 770 when the inter-frame coding is selected and supplies a prediction value which is set to "0" to the subtracter 760 and adder 770 when the intra-frame coding is selected.

The subtracter 760 creates a difference signal between an input image signal and a prediction signal and supplies the same to a DCT circuit 780. The prediction error signal transformed into a transform coefficient in the DCT circuit 780 is supplied to a quantizer 790. The transform coefficient quantized in the quantizer 790 is supplied to an inverse quantizer 800 and the transform coefficient inversely quantized in the inverse quantizer 800 is supplied to an inverse DCT circuit 810. The inverse DCT circuit 810 inversely transforms the transform coefficient into a prediction error signal and supplies the same to the adder 770. The adder 770 adds together the prediction error signal and prediction value to create a local decoding image and supplies the same to the second frame memory 720. Further, the transform coefficient quantized in the quantizer 790 is also supplied to a variable-length coding circuit 820.

The variable-length coding circuit 820 variable-length codes the transform coefficient quantized in the quantizer 790 together with additional information containing MV and supplies the result to a multiplexer circuit 830.

The multiplexer circuit 830 multiplexes the variable-length code supplied from the variable-length coding circuit 820 and outputs a coded bit stream via an output buffer 840.

Further, the output buffer 840 supplies the remaining amount of coded bit stream in the buffer to the coding control circuit 740.

The coding control circuit 740 makes a determination for an optimum prediction method (for example, front prediction, rear prediction) and determination of intra-frame coding or inter-frame coding for each block by using the prediction image signal supplied from the motion compensation prediction circuit 730 and the input image signal supplied from the first frame memory 700 and thus determines the prediction mode. In this case, if an image signal belonging to an area 1 is referred to when a block belonging to an area 2 in FIG. 6 is subjected to the motion compensation prediction, the intra-frame prediction mode is forcedly set. At this time, if the error resistance is required, a mode for giving a motion vector in the intra-frame prediction coding process is set and motion vector information is also supplied to the variable-length coding circuit 820.

The thus determined information of determination of intra-frame/inter-frame is supplied to the intra-frame/inter-frame switching circuit 750. Further, the quantization step size is determined to correspond to the set coding amount based on the remaining amount of coded bit stream supplied from the output buffer and is supplied to the quantizer 790 and inverse quantizer 800.

As described above according to the seventh embodiment, when a block belonging to a refresh area (area 2 in FIG. 24) refers to an image signal belonging to an area (area 1 in FIG. 24) other than the refresh area as a result of detection of the motion vector on the transmission side, the refresh can be effected without limiting the searching range of the motion vector by forcedly intra-frame coding the block, attaching the motion vector thereto and then transmitting the same, and the concealment can be effected by use of the highly reliable motion vector on the receiver side.

The following will explain a motion picture image transmitting apparatus of an eighth embodiment of this invention with reference to FIG. 25 and FIGS. 26A to 26C. It is noted that FIG. 26A is a view explaining a motion compensation prediction of MPEG. 1, and FIGS. 26B and 26C are views showing a motion compensation prediction used in MPEG. 2 in addition to FIG. 26A.

The motion picture image transmitting apparatus of this embodiment may be any type of coding apparatus for coding a motion picture such as ITU-T (formerly, CCITT) recommendation H.262 (MPEG. 2 of ISO) in the block unit by use of motion compensation.

In this embodiment, the motion compensation prediction (a prediction mode such as forward prediction and backward prediction and a motion vector) used in decodable blocks (blocks A to H in FIG. 8A) which are adjacent to a block (block X in FIG. 8A) which is made non-decodable by the packet loss or channel error is set as a candidate of the motion compensation prediction used for concealment. A suitable motion prediction is selected from the candidates, and the motion compensation prediction is used to subject the block X to the concealment.

In MPEG. 2 (H. 262 of ITU-T) of ISO, since various prediction modes exist, there are provided the pixel average value calculating circuit, which is required for ½ pixel motion compensation, bi-directional prediction mode of B picture or dual-prime prediction of P picture, and four motion vectors in maximum. In FIGS. 26A to 26C, only the frame structure is shown. As a reference document of the motion compensation prediction, there is "MPEG. 2/H. 262" by Watanabe, Journal of Institute of Television Engineers of Japan, Vol. 48, No. 1, pp. 44–49 (1994).

In FIGS. 26A to 26C, the motion vectors each shown by a broken line are motion vectors, which are reconstructed by the receiving side. In these figures, each of white circles shows a prediction value of ½ pixel position. In frame MC of FIG. 26A, though the number of the motion vectors to be reconstructed is one forward motion vector and one backward motion vector, the same motion vectors to the pixel of each field are shown o as to meet MPEG. 2. In this case, the vector from the left to the right shows the forward direction, and the vector from the right to the left shows the backward vector. In dual-prime of FIG. 26C, four motion vectors including one motion vector and one differential motion vector (dmv) are reconstructed. It is noted that a backward motion vector (not shown) exists in field MC of FIG. 26B.

Regarding the method for selecting the motion compensation prediction, the above-mentioned prior art may be used or a method to be described in another embodiment of the present invention may be used.

The motion picture transmission apparatus of FIG. 25 is different from that of FIG. 7 in a motion compensation memory 120 and a concealment circuit 140. More specifically, the motion compensation memory 120 of FIG. 25 comprises a MC simplifying circuit 121, a motion vector memory 122, and a non-decodability identifying information flag memory 123. The concealment circuit 140 comprises a selection circuit 48 and a second motion compensation circuit 149. In the motion picture transmission apparatus of this embodiment, the other structure excepting the structure of FIG. 25 may be used if the motion compensation prediction circuit 113 is included.

According to this embodiment, the method for expressing the motion compensation prediction of the concealment can be simplified as follows:

(1) In the case of the prediction of both directions, either the prediction of the forward direction or the prediction of the backward direction is used (FIG. 26A);

(2) In the case of dual-prime MC, only the field having the same phase is referred; and (3) The motion vector indicating a ½ pixel position is converted to one pixel position.

In FIGS. 26A to 26C, a small white circle shows a prediction value of ½ pixel position, and the motion compensation prediction expressed by a motion vector shown by a broken line is simplified to a motion compensation prediction expressed by a motion vector shown by a solid line. By this simplicity, the motion compensation of the concealment can be realized from each of the motion vectors to each field and flag information of reference field (field 1 or field 2), which each motion vector shows, regardless of the prediction mode.

As the preferred embodiment, in the case of the field structure in which the block is structured by the unit of field, one motion vector and the flag of the reference field should be needed in each block. In the case of the frame structure in which the block is structured by the unit of block, two motion vectors and the flag of each reference field should be needed.

In the motion compensation memory 120 of FIG. 25, as information of the motion compensation method supplied through the line 30 by the MC simplicity circuit 121, there can be obtained the motion vector, which is shown by the solid line of each of FIGS. 26A to 26C, and the flag, which shows the field to which each vector refers. In this case, if the block is the intra-frame coding or non-decodable, the motion vector is set to 0, and the flag showing the field having the same phase is raised.

Moreover, the motion vector and the flag of the reference field, which is related to each block as hatched in FIG. 8A, are stored in the motion vector memory 122. Then, the non-decodable identifying information flag, which is related to each block as hatched in FIG. 8A, is stored in the non-decodability identifying information flag memory 123.

Moreover, an image signal of the block as hatched in FIG. 8A is stored in a frame memory 130. In other words, until decoding of block H is ended and a signal of block H is stored in the motion compensation information memory 120 and the frame memory 130, a signal of block X is delayed. Thereafter, the signal is concealed to be outputted. In this case, since the non-decodability identifying information flag is supplied through the line 20, there is no need that the motion compensation information of the block, which is recognized as non-decodability, and image data are rewritten.

In the concealment circuit 140, a suitable motion compensation prediction, which is decodable and which is coded in the frame, from the motion vector memory 122, and the selected the motion compensation prediction is supplied to a second motion compensation circuit 149.

In the second compensation circuit 149, the reference image indicated by the motion picture of the solid line selected by the selection circuit 148 is only read from the frame memory 130, so that a concealment image is formed and supplied to a selector 150.

In a case where the block adjacent to the block X is non-decodable or motion compensation information cannot be obtained since the block adjacent to the block X is not in the motion compensation mode, for example, image data of the block, which is placed at the same position as the block X of the reference image stored in the frame memory 130 is read and supplied to the selector 150. The above-mentioned point that the block adjacent to the block X is not in the motion compensation mode means, for example, that the block is set in the intra-frame coding mode.

The selector 150 outputs a signal corresponding to the block X stored in the frame memory 130 through the line 60 if the block (block X) is decodable by the undecodable identifying information flag supplied from the motion compensation information memory 120. Also, the selector 150 outputs a concealment image through the line 60 if the block is undecodable. Then, the coding of block H is ended, and obtained information is stored in the frame memory 130 and the motion compensation information memory 120. Thereafter, image of the block X is delayed, and outputted through the line 60 from the selector 150.

As mentioned above, the error-compensated image signal outputted through the line 60 is stored in the frame memory 130 as a reference image for a next frame.

The following will explain an ninth embodiment of the present invention with reference to FIG. 27. The embodiment of FIG. 27 is an embodiment in which the second embodiment of FIG. 12 and the third embodiment of FIG. 13 are combined. In FIG. 27, the same reference numerals, which are common to FIGS. 12 and 13, are added.

In the ninth embodiment, the motion compensation prediction used in the decodable blocks (blocks A to H in FIG. 2A) which are adjacent to the block (block X in FIG. 2A) which is made non-decodable by packet loss or channel line error is set as a candidate of the motion compensation prediction used at the time of concealment of the corresponding block, the reliability of the motion compensation is evaluated by calculating the ratio of the activity of the motion compensation prediction error signal in the decodable block adjacent to the corresponding block to the activity of the motion compensation prediction signal at the time of selection of adequate motion compensation prediction used in the corresponding block, and motion compensation prediction having the highest reliability is selected.

Thus, according to the ninth embodiment, even if the correlation of motion vector between adjacent blocks is small, an adequate one of the candidates of motion compensation prediction can be selected. Therefore, the prediction precision of an image obtained by subjecting the non-decodable block to the concealment can be enhanced.

Also, in the ninth embodiment, in the concealment method using the motion compensation prediction of adjacent blocks, a weighted average value of a prediction signal created by subjecting the block which is made non-decodable by the packet loss or channel error to the motion compensation prediction by using the selected adequate motion vector and motion compensation method ad an interpolation prediction signal created by subjecting the pixel values in the block to the interpolation prediction by using a plurality of pixel values near the block is used as an image signal of the block.

Thus, according to the ninth embodiment, the block-shaped distortion which may be caused by discontinuity of the low-frequency component between the adjacent blocks can be reduced.

The following will explain a tenth embodiment of the present invention with reference to FIG. 28. The embodiment of FIG. 28 is an embodiment in which the second embodiment of FIG. 12 and the fourth embodiment of FIG. 15 are combined. In FIG. 28, the same reference numerals, which are common to FIGS. 12 and 15, are added.

In the tenth embodiment, the motion compensation prediction used in the decodable blocks (blocks A to H in FIG. 2A) which are adjacent to the block (block X in FIG. 2A) which is made non-decodable by packet discharging or transmission line error is set as a candidate of the motion compensation prediction used at the time of concealment of the corresponding block, the reliability of the motion compensation is evaluated by calculating the ratio of the activity of the motion compensation prediction error signal in the decodable block adjacent to the corresponding block to the activity of the motion compensation prediction signal at the time of selection of adequate motion compensation prediction used in the corresponding block, and motion compensation prediction having the highest reliability is selected.

Thus, according to the tenth embodiment, even if the correlation of motion vector between adjacent blocks is small, an adequate one of the candidates of motion compensation prediction can be selected. Therefore, the prediction precision of an image obtained by subjecting the non-decodable block to the concealment can be enhanced.

Also, in the tenth embodiment, in the concealment method using the motion compensation prediction of adjacent blocks, a weighted average value of a prediction signal created by subjecting the block which is made non-decodable by the packet loss or channel error to the motion compensation prediction by using the selected adequate motion vector and motion compensation method ad an interpolation prediction signal created by subjecting the pixel values in the block to the interpolation prediction by using a plurality of pixel values near the block is used as an image signal of the block.

Thus, according to the tenth embodiment, the block-shaped distortion which may be caused by discontinuity of the low-frequency component between the adjacent blocks can be reduced.

As described above, according to this invention, when the concealment is effected for a block which is made non-decodable by packet loss or channel error, the motion compensation prediction applied to the non-decodable block can be adequately selected from those of the decodable blocks adjacent to the non-decodable block even if the correlation of motion vector between the adjacent blocks is small. Thus, the prediction precision of an image obtained by subjecting the non-decodable block to the concealment can be enhanced.

Further, according to this invention, in the concealment method using the motion compensation prediction of adjacent blocks, the block-form distortion which may be caused by discontinuity of the low-frequency component between the adjacent blocks can be reduced by using the low-frequency component predicted from signals in the adjacent blocks.

Further, according to this invention, the possibility that image data is lost by packet discarding or transmission line error can be suppressed by lowering the space resolution of an image obtained immediately after occurrence of scene change, and even if part of data image obtained immediately after occurrence of the scene change is lost, the lost edge portion can be reproduced at an early stage since the high frequency component which cannot be reproduced in the concealment by space interpolation is contained in the motion compensation prediction error. At the same time, the amount of generation information of the image obtained immediately after occurrence of the scene change is reduced.

Further, according to this invention, even if the space resolution is lowered by the concealment by space interpolation to blur the edge portion, the edge blur can be prevented by forcedly intra-frame coding the edge portion in the next frame.

Further, according to this invention, a block contained in a refresh area will not refer to a block contained in an area other than the refresh area without limiting the searching range of the motion vector and the highly reliable motion vector can be utilized in the concealment apparatus using the motion vector on the receiver side.

Further, according to this invention, when a block belonging to a refresh area (area 2 in FIG. 24) refers to an image signal belonging to an area (area 1 in FIG. 24) other than the refresh area as a result of detection of the motion vector on the transmission side, the refresh can be effected without limiting the searching range of the motion vector by forcedly intra-frame coding the block and then transmitting the same after attaching the motion vector thereto, and the concealment can be effected by use of the highly reliable motion vector on the receiver side.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A motion picture receiving apparatus for receiving information obtained by coding a motion picture signal in the block unit by use of the motion compensation and for decoding the received data in the block unit, comprising:

error detection means for detecting an error of the coded data received and outputting an error detection signal;

identifying means for identifying a block being made non-decodable by the error;

a motion compensation memory for storing data of an identification result of the identifying means and a motion compensation method, and having means for simplifying data of the motion compensation method, and means for storing the motion compensation method simplified by said simplifying means;

a generating section for generating data of the motion compensation method applied to the block being identified to be non-decodable, said generating section comprising means for generating data of the motion compensation method applied to the block being identified to be non-decodable from data of the motion compensation method simplified by said simplifying means by said identifying means from data of a plurality of decodable blocks lying near the block identified to be non-decodable; and correction means for correcting the block identified to be non-decodable by said identifying means by said motion compensation method by use of data of said motion compensation method generated by said generating section, said correction means comprising means for correcting the block identified to be non-decodable by said identifying means by the motion compensation by use of data of the simplified compensation method generated by said generating section.

2. An apparatus according to claim 1, wherein said data of the motion compensation method is motion vector data.

3. A motion picture receiving apparatus for receiving data obtained by coding a motion picture signal in the block unit by use of motion compensation and for decoding the received data in the block unit, comprising:

decoding means for decoding received data which is made non-decodable detecting an error of the coded data, and outputting an error detection signal;

identifying means for identifying a block being made non-decodable by the error;

a motion compensation memory for storing data of an identification result of the identifying means and a motion compensation method, and having means for simplifying data of the motion compensation method, and means for storing the motion compensation method simplified by said simplifying means, a generating section for generating data of the motion compensation method applied to the block being identified to be non-decodable by said identifying means from data of a plurality of decodable blocks lying near the block identified to be non-decodable, said generating section comprising means for generating information of the motion compensation method applied to the block being identified to be non-decodable from data of the motion compensation method simplified by said simplifying means; and correction means for correcting the block identified to be non-decodable by said identifying means by said motion compensation method by use of data of said motion compensation method generated by said generating section, said correction means comprising means for correcting the block identified to be non-decodable by said identifying means by the motion compensation by use of data of the simplified compensation by use of data of the simplified compensation method generated by said generating section.

4. An apparatus according to claim 3, wherein said motion compensation method is data of the motion vector data.

* * * * *